US011758566B2

(12) United States Patent
Sakhnini et al.

(10) Patent No.: US 11,758,566 B2
(45) Date of Patent: Sep. 12, 2023

(54) WAVEFORM-SPECIFIC TRANSMISSION PARTS

(71) Applicant: QUALCOMM Incorporated, San Diego, CA (US)

(72) Inventors: Iyab Issam Sakhnini, San Diego, CA (US); Tao Luo, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 17/226,810

(22) Filed: Apr. 9, 2021

(65) Prior Publication Data

US 2022/0330252 A1    Oct. 13, 2022

(51) Int. Cl.
*H04W 72/53* (2023.01)
*H04W 76/28* (2018.01)
(Continued)

(52) U.S. Cl.
CPC ............. *H04W 72/53* (2023.01); *H04W 8/24* (2013.01); *H04W 72/0446* (2013.01);
(Continued)

(58) Field of Classification Search
CPC ... H04W 72/53; H04W 8/24; H04W 72/0446; H04W 72/0453; H04W 72/23; H04W 76/28
See application file for complete search history.

(56) References Cited

U.S. PATENT DOCUMENTS

2016/0182202 A1\* 6/2016 Patel ................... H04L 25/0226
370/336
2018/0254794 A1\* 9/2018 Lee ....................... H04J 11/0069
(Continued)

FOREIGN PATENT DOCUMENTS

| EP | 3537824 A1 | 9/2019 |
|---|---|---|
| WO | WO-2018080758 A1 | 5/2018 |
| WO | WO-2020167178 A1 | 8/2020 |

OTHER PUBLICATIONS

International Search Report and Written Opinion—PCT/US2022/019793—ISA/EPO—dated Jun. 20, 2022.
(Continued)

*Primary Examiner* — Jael M Ulysse
(74) *Attorney, Agent, or Firm* — Arun Swain

(57) ABSTRACT

Methods, systems, and devices for wireless communications are described. In some systems, a base station may configure a set of transmission parts each including different sets of time domain resources or different sets of frequency domain resources, or both, and may specify a waveform type for each of the set of transmission parts. In some examples, the base station may configure the set of transmission parts for a user equipment (UE) and, accordingly, the UE and the base station may communicate over a transmission part of the set of transmission parts via signaling that is based on a waveform type that is associated with the transmission part over which the UE and the base station communicate. The base station may control over which transmission part of the set of transmission parts the UE and the base station communicate via a configured timer or via explicit activation and deactivation signaling.

62 Claims, 16 Drawing Sheets

(51) Int. Cl.
*H04W 8/24* (2009.01)
*H04W 72/0446* (2023.01)
*H04W 72/0453* (2023.01)
*H04W 72/23* (2023.01)

(52) U.S. Cl.
CPC ....... *H04W 72/0453* (2013.01); *H04W 72/23* (2023.01); *H04W 76/28* (2018.02)

(56) References Cited

U.S. PATENT DOCUMENTS

| | | | |
|---|---|---|---|
| 2018/0287762 A1* | 10/2018 | Sun | H04L 5/0053 |
| 2019/0028313 A1* | 1/2019 | Takeda | H04L 27/2636 |
| 2019/0208520 A1* | 7/2019 | Matsumura | H04L 27/2636 |
| 2019/0253298 A1* | 8/2019 | Moroga | H04L 27/2646 |
| 2019/0254014 A1 | 8/2019 | Martin et al. | |
| 2019/0260498 A1* | 8/2019 | Moroga | H04W 72/20 |
| 2019/0335359 A1* | 10/2019 | Moroga | H04W 28/06 |
| 2019/0335537 A1* | 10/2019 | Moroga | H04W 72/51 |
| 2019/0364454 A1 | 11/2019 | Park et al. | |
| 2019/0372813 A1* | 12/2019 | Moroga | H04L 27/2602 |
| 2020/0100241 A1* | 3/2020 | Takeda | H04L 5/0007 |
| 2020/0154428 A1* | 5/2020 | Takeda | H04L 27/2636 |
| 2020/0314837 A1* | 10/2020 | Oh | H04L 5/0094 |
| 2021/0281455 A1* | 9/2021 | Lee | H04L 27/2627 |
| 2022/0070775 A1* | 3/2022 | Elkotby | H04W 52/0229 |
| 2022/0345261 A1* | 10/2022 | Ali | H04L 5/0096 |

OTHER PUBLICATIONS

3GPP TSG RAN WG1 Meeting #55—Consideration on LTE—a Uplink Multiple Access Scheme; Research in Motion, Limited; R1-084101; Prague, Czech Republic, Nov. 10-14, 2008. 6 pages.

* cited by examiner

… (1)

WAVEFORM-SPECIFIC TRANSMISSION PARTS

FIELD OF TECHNOLOGY

The following relates to wireless communications, including waveform-specific transmission parts.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support waveform-specific transmission parts. Generally, the described techniques provide for organizing and scheduling waveform-specific communications between user equipment (UEs) and a base station such that different UEs or the same UE may communicate with the base station via signaling that is based on different waveform types.

In some examples, for instance, the network may configure a quantity of transmission parts, each of which may correspond to a defined set of time and frequency resources. A transmission part may be either continuous or discontinuous in time and also may be either continuous or discontinuous in frequency. Each transmission part may be associated with (e.g., configured for) a designated waveform type, such as a single-carrier frequency domain waveform, a single-carrier time domain waveform, or a multi-carrier frequency domain waveform, among other possibilities. As such, a UE may receive a configuration of one or more transmission parts and the configuration of the one or more transmission types may indicate a waveform type that the UE is to use for communication within each of the one or more transmission parts, such that different waveform types may be configured for different transmission parts. In some implementations, each transmission part of the set of transmission parts may be associated with a set of parameters in addition to a waveform type, such as a cyclic prefix (CP) length, a subcarrier spacing (SCS), a chip rate, or switching gaps, among other examples.

One or more transmission parts may be activated or deactivated for a UE over the course of time, such that in some cases the UE may communicate with the base station via different transmission parts (and thus, in some cases, via signaling of different waveform types) at different points in time. And in some cases, more than one transmission part may be concurrently active for the same UE, with the UE potentially concurrently communicating with the base station via multiple transmission parts (including potentially via signaling of different waveform types), depending on UE capability. These and other aspects of the teachings herein may reduce related scheduling complexities and provide mechanisms for greater interference management related to different UEs or the same UE using different waveform types within a wireless communications system, among other advantages that may be appreciated by one of ordinary skill in the art.

A method for wireless communication at a UE is described. The method may include receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, communicating with the base station, during a first time period, over the first transmission part via signaling that is based on the first waveform type, and communicating with the base station, during a second time period after the first time period, over the second transmission part via signaling that is based on the second waveform type.

An apparatus for wireless communication at a UE is described. The apparatus may include a processor, memory coupled with the processor, and instructions stored in the memory. The instructions may be executable by the processor to cause the apparatus to receive, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, communicate with the base station, during a first time period, over the first transmission part via signaling that is based on the first waveform type, and communicate with the base station, during a second time period after the first time period, over the second transmission part via signaling that is based on the second waveform type.

Another apparatus for wireless communication at a UE is described. The apparatus may include means for receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, means for communicating with the base station, during a first time period, over the first transmission part via signaling that is based on the first waveform type, and means for communicating with the base station, during a second time period after the first time period, over the second transmission part via signaling that is based on the second waveform type.

A non-transitory computer-readable medium storing code for wireless communication at a UE is described. The code may include instructions executable by a processor to receive, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, communicate with the base station, during a first time period, over the first transmission part via signaling that is based on the first waveform type, and communicate with the base station, during a second time period after the first time period, over the second transmission part via signaling that is based on the second waveform type.

Some examples of the method, apparatuses, and non-transitory computer-readable medium described herein may further include operations, features, means, or instructions for receiving a system information block (SIB) including a configuration of an initial transmission part different than the first transmission part and the second transmission part, where the SIB associates the initial transmission part with an initial waveform type that may be the first waveform type, the second waveform type, or a third waveform type and communicating with the base station over the initial transmission part via signaling that may be based on the initial waveform type before the first time period.

Some examples of the method, apparatuses, and non-transitory computer-readable medium described herein may further include operations, features, means, or instructions for receiving an indication of a default transmission part of the set of transmission parts, where the default transmission part includes the first transmission part and the communicating with the base station over the first transmission part during the first time period may be based on the indication of the default transmission part.

Some examples of the method, apparatuses, and non-transitory computer-readable medium described herein may further include operations, features, means, or instructions for receiving, from the base station, an activation message for one or more transmission parts of the set of transmission parts including the second transmission part, where the communicating over the second transmission part associated with the second waveform type may be based on the activation message.

Some examples of the method, apparatuses, and non-transitory computer-readable medium described herein may further include operations, features, means, or instructions for receiving, from the base station, a deactivation message for the one or more transmission parts of the set of transmission parts and switching, based on the deactivation message, from communicating with the base station over the second transmission part associated with the second waveform type to communicating with the base station over the first transmission part associated with the first waveform type or to communicating with the base station over a third transmission part associated with a third waveform type.

Some examples of the method, apparatuses, and non-transitory computer-readable medium described herein may further include operations, features, means, or instructions for receiving, from the base station, an indication of a duration for a timer associated with the one or more transmission parts of the set of transmission parts, where the one or more transmission parts each become deactivated for the UE upon expiration of the timer and switching, based on the expiration of the timer, from communicating with the base station over the second transmission part associated with the second waveform type to communicating with the base station over the first transmission part associated with the first waveform type or to communicating with the base station over a third transmission part associated with a third waveform type.

In some examples of the method, apparatuses, and non-transitory computer-readable medium described herein, the first transmission part and the second transmission part may be concurrently active for the UE.

In some examples of the method, apparatuses, and non-transitory computer-readable medium described herein, the set of transmission parts may include operations, features, means, or instructions for a set of uplink-specific transmission parts associated with a first set of uplink-specific communication parameters and a set of downlink-specific transmission parts associated with a set of downlink-specific communication parameters.

In some examples of the method, apparatuses, and non-transitory computer-readable medium described herein, each transmission part of the set of transmission parts may be for both uplink communication and downlink communication, and and the indication associates each transmission part of the set of transmission parts with a respective set of communication parameters that may be common for the uplink communication and the downlink communication.

In some examples of the method, apparatuses, and non-transitory computer-readable medium described herein, at least one of the first transmission part and the second transmission part is discontinuous in time, and the communicating with the base station over the first transmission part or the second transmission part may include operations, features, means, or instructions for communicating in accordance with a communication timeline that may be transparent to one or more time gaps associated with at least one of the first transmission part and the second transmission part being discontinuous in time.

In some examples of the method, apparatuses, and non-transitory computer-readable medium described herein, at least one of the first transmission part and the second transmission part is discontinuous in time, and the communicating with the base station over the first transmission part or the second transmission part may include operations, features, means, or instructions for communicating in accordance with a communication timeline that accounts for one or more time gaps associated with at least one of the first transmission part and the second transmission part being discontinuous in time.

Some examples of the method, apparatuses, and non-transitory computer-readable medium described herein may further include operations, features, means, or instructions for receiving, from the base station, a grant for a transmission resource outside of one or more active transmission parts of the set of transmission parts and communicating with the base station, based on the grant, via the transmission resource that may be outside of the one or more active transmission parts.

Some examples of the method, apparatuses, and non-transitory computer-readable medium described herein may further include operations, features, means, or instructions for receiving, from the base station, a grant for a transmission resource outside of one or more active transmission parts of the set of transmission parts and refraining from communicating with the base station, based on the grant, via the transmission resource that may be outside of the one or more active transmission parts.

Some examples of the method, apparatuses, and non-transitory computer-readable medium described herein may further include operations, features, means, or instructions for receiving, from the base station, a configuration of one or more switching gaps or one or more guard bands each between a respective pair of transmission parts within the set of transmission parts and switching, during a switching gap of the one or more switching gaps, from communicating with the base station over the first transmission part associated with the first waveform type to communicating with the base station over the second transmission part associated with the second waveform type.

Some examples of the method, apparatuses, and non-transitory computer-readable medium described herein may further include operations, features, means, or instructions for transmitting, to the base station, a capability message indicating a set of waveform types that the UE may be capable of using, where the indication of the set of transmission parts may be based on the capability message.

In some examples of the method, apparatuses, and non-transitory computer-readable medium described herein, the respective set of time resources and frequency resources for a transmission part of the set of transmission parts may be discontinuous in time, discontinuous in frequency, or discontinuous in both time and frequency.

In some examples of the method, apparatuses, and non-transitory computer-readable medium described herein, the first waveform type includes a first one of a single carrier frequency domain waveform, a single carrier time domain waveform, or an orthogonal frequency division multiplexing (OFDM) waveform and the second waveform type includes a second one of the single carrier frequency domain waveform, the single carrier time domain waveform, or the OFDM waveform.

A method for wireless communication at a base station is described. The method may include transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, communicating with the UE, during a first period, over the first transmission part via signaling that is based on the first waveform type, and communicating with the UE, during a second time period after the first time period, over the second transmission part via signaling that is based on the second waveform type.

An apparatus for wireless communication at a base station is described. The apparatus may include a processor, memory coupled with the processor, and instructions stored in the memory. The instructions may be executable by the processor to cause the apparatus to transmit, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, communicate with the UE, during a first period, over the first transmission part via signaling that is based on the first waveform type, and communicate with the UE, during a second time period after the first time period, over the second transmission part via signaling that is based on the second waveform type.

Another apparatus for wireless communication at a base station is described. The apparatus may include means for transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, means for communicating with the UE, during a first period, over the first transmission part via signaling that is based on the first waveform type, and means for communicating with the UE, during a second time period after the first time period, over the second transmission part via signaling that is based on the second waveform type.

A non-transitory computer-readable medium storing code for wireless communication at a base station is described. The code may include instructions executable by a processor to transmit, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type, communicate with the UE, during a first period, over the first transmission part via signaling that is based on the first waveform type, and communicate with the UE, during a second time period after the first time period, over the second transmission part via signaling that is based on the second waveform type.

Some examples of the method, apparatuses, and non-transitory computer-readable medium described herein may further include operations, features, means, or instructions for transmitting an SIB including a configuration of an initial transmission part different than the first transmission part and the second transmission part, where the SIB associates the initial transmission part with an initial waveform type that may be the first waveform type, the second waveform type, or a third waveform type and communicating with the UE over the initial transmission part via signaling that may be based on the initial waveform type before first time period.

Some examples of the method, apparatuses, and non-transitory computer-readable medium described herein may further include operations, features, means, or instructions for transmitting an indication of a default transmission part of the set of transmission parts, where the default transmission part includes the first transmission part and the communicating with the UE over the first transmission part during the first time period may be based on the indication of the default transmission part.

Some examples of the method, apparatuses, and non-transitory computer-readable medium described herein may further include operations, features, means, or instructions for transmitting, to the UE, an activation message for one or more transmission parts of the set of transmission parts including the second transmission part, where the communicating over the second transmission part associated with the second waveform type may be based on the activation message.

Some examples of the method, apparatuses, and non-transitory computer-readable medium described herein may further include operations, features, means, or instructions for transmitting, to the UE, a deactivation message for the one or more transmission parts of the set of transmission parts and switching, based on transmitting the deactivation message, from communicating with the UE over the second transmission part associated with the second waveform type to communicating with the UE over the first transmission part associated with the first waveform type or to communicating with the UE over a third transmission part associated with a third waveform type.

Some examples of the method, apparatuses, and non-transitory computer-readable medium described herein may further include operations, features, means, or instructions for transmitting, to the UE, an indication of a duration for a timer associated with the one or more transmission parts, where the one or more transmission parts each become deactivated for the UE upon expiration of the timer, and switching, based on the expiration of the timer, from communicating with the UE over the second transmission part associated with the second waveform type to communicating with the UE over the first transmission part associated with the first waveform type or to communicating with the UE over a third transmission part associated with a third waveform type.

In some examples of the method, apparatuses, and non-transitory computer-readable medium described herein, the first transmission part and the second transmission part may be concurrently active for the UE.

In some examples of the method, apparatuses, and non-transitory computer-readable medium described herein, the set of transmission parts may include a set of uplink-specific transmission parts associated with a first set of uplink-specific communication parameters and a set of downlink-specific transmission parts associated with a set of downlink-specific communication parameters.

In some examples of the method, apparatuses, and non-transitory computer-readable medium described herein, each transmission part of the set of transmission parts may be for both uplink communication and downlink communication, and the indication associates each transmission part of the set of transmission parts with a respective set of communication parameters that may be common for the uplink communication and the downlink communication.

In some examples of the method, apparatuses, and non-transitory computer-readable medium described herein, at least one of the first transmission part and the second transmission part may be discontinuous in time, and the communicating with the UE over the first transmission part or the second transmission part may include operations, features, means, or instructions for communicating in accordance with a communication timeline that may be transparent to one or more time gaps associated with at least one of the first transmission part and the second transmission part being discontinuous in time.

In some examples of the method, apparatuses, and non-transitory computer-readable medium described herein, at least one of the first transmission part and the second transmission part may be discontinuous in time, and the communicating with the UE over the first transmission part or the second transmission part may include operations, features, means, or instructions for communicating in accordance with a communication timeline that accounts for one or more time gaps associated with at least one of the first transmission part and the second transmission part being discontinuous in time.

Some examples of the method, apparatuses, and non-transitory computer-readable medium described herein may further include operations, features, means, or instructions for transmitting, to the UE, a grant for a transmission resource outside of one or more active transmission parts of the set of transmission parts and communicating with the UE, based on the grant, via the transmission resource that may be outside of the one or more active transmission parts.

Some examples of the method, apparatuses, and non-transitory computer-readable medium described herein may further include operations, features, means, or instructions for transmitting, to the UE, a configuration of one or more switching gaps or one or more guard bands each between a respective pair of transmission parts within the set of transmission parts and switching, during a switching gap of the one or more switching gaps, from communicating with the UE over the first transmission part associated with the first waveform type to communicating with the UE over the second transmission part associated with the second waveform type.

Some examples of the method, apparatuses, and non-transitory computer-readable medium described herein may further include operations, features, means, or instructions for receiving, from the UE, a capability message indicating a set of waveform types that the UE may be capable of using, where the indication of the set of transmission parts may be based on the capability message.

In some examples of the method, apparatuses, and non-transitory computer-readable medium described herein, the respective set of time resources and frequency resources for a transmission part of the set of transmission parts may be discontinuous in time, discontinuous in frequency, or discontinuous in both time and frequency.

In some examples of the method, apparatuses, and non-transitory computer-readable medium described herein, the first waveform type includes a first one of a single carrier frequency domain waveform, a single carrier time domain waveform, or an OFDM waveform and the second waveform type includes a second one of the single carrier frequency domain waveform, the single carrier time domain waveform, or the OFDM waveform.

DETAILED DESCRIPTION

Figure 1:
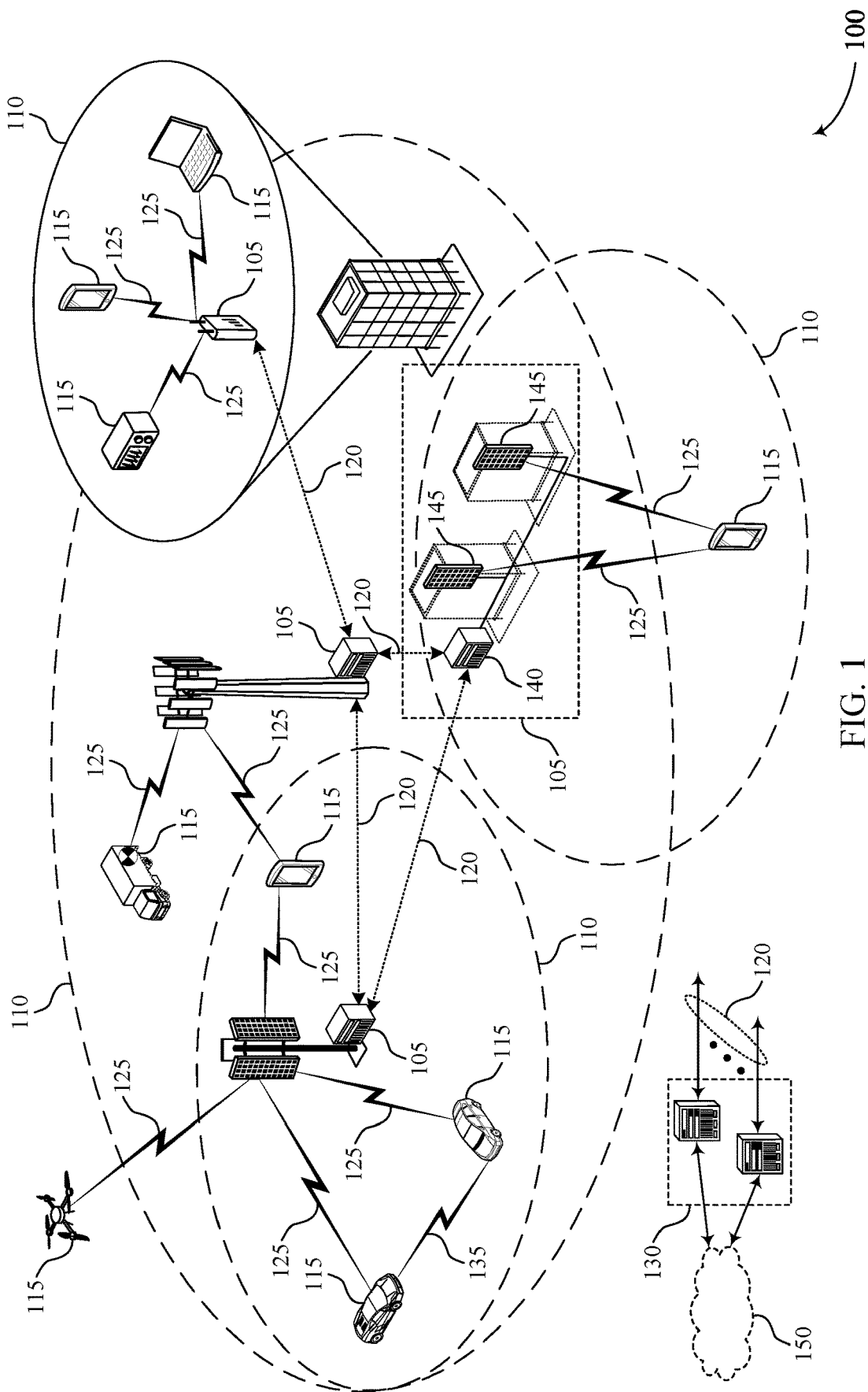
FIGS. 1 and 2 illustrate examples of wireless communications systems that supports waveform-specific transmission parts in accordance with aspects of the present disclosure.

As demand for communication resources increases due to an increasing quantity of wireless devices communicating over an available spectrum, higher and higher frequencies may become used for communications. And as higher frequencies are used for communications, as just one example reason, larger bandwidths may become available and desirable for use. For example, a user equipment (UE) and a base station may communicate over relatively higher frequency ranges (e.g., such as frequency ranges used in FR2 radio frequency bands, including millimeter wave (mmW) frequency ranges, or FR4 radio frequency bands), and communication over such relatively higher frequency bands may enable the UE and the base station to communicate over relatively larger bandwidths.

For larger bandwidth operation, tradeoffs may exist between different waveform types based on operating conditions or constraints associated with the UE or based on a deployment scenario of the UE (e.g., tradeoffs between supported cell coverage area, supported throughput, implementation complexity, etc.). As such, which waveform type, along with other parameters, is desirable for use may vary across UEs or for a same UE over time (e.g., across different operating scenarios). Scheduling complexities and interference issues related to the use of different waveform types by different UEs or by a same UE over time within the same wireless communications system may arise, however, which may result in added system complexity or a greater likelihood for communication failures (e.g., as a result of more impactful interference).

In some implementations of the present disclosure, the base station (e.g., the network) may organize communications between UEs and the base station according to waveform type. For example, the base station may configure a quantity of transmission parts (which may refer to a set of time or frequency resources, or both) and each transmission part of the quantity of transmission parts may be associated with (e.g., configured for) a designated waveform type. As such, a UE may receive a configuration of the quantity of transmission parts from the base station and the configuration may indicate a waveform type that the UE is to use for communication over each of the quantity of transmission parts (e.g., such that different waveform types may be configured for different transmission parts). For example, in accordance with the configuration, the UE and the base station may communicate via signaling that is based on a first waveform type within a first transmission part of the quantity of transmission parts and via signaling that is based on a second waveform type within a second transmission part of the quantity of transmission parts.

Particular implementations of the subject matter described in this disclosure can be implemented to realize one or more of the following potential advantages. For example, the described techniques may be implemented to organize communication among various devices within a system according to waveform type, which may reduce the scheduling complexities and the interference issues related to the use of different waveform types by different UEs or by a same UE over time. For instance, based on designating a waveform type to one or more pre-configured or pre-defined transmission parts, the base station may experience lower complexity when scheduling communication of varying waveform types (e.g., such scheduling may be achieved using activating and deactivation messages, which may indicate which one or more previously configured transmission parts are active for a UE at any given time, such that the UE may monitor and communicate according to the one or more transmission parts currently active at any given time). Further, such organization or pre-configuration of transmission parts with a designated waveform type may provide the base station with a greater capability for efficiently managing interference between different waveform types or may otherwise provide the base station with an efficient method for avoiding scenarios in which interference between different waveform types may arise, as the base station may designate potentially interfering waveform types to transmission parts that are separated in time or frequency, or both. And in some cases, the base station may further pre-configure one or more switches between different transmission parts (and thus potentially between different waveform types) for a UE, and such pre-configured switches between pre-configured transmission parts may be associated with further reduced latency.

Aspects of the disclosure are initially described in the context of wireless communications systems. Additionally, aspects of the disclosure are illustrated by and described with reference to a communication timeline and a process flow. Aspects of the disclosure are further illustrated by and described with reference to apparatus diagrams, system diagrams, and flowcharts that relate to waveform-specific transmission parts.

FIG. 1 illustrates an example of a wireless communications system 100 that supports waveform-specific transmission parts in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is continuous in the time domain and may be operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth. In some cases, only one BWP may be active for a single UE 115 at any given point in time.

Signal waveforms transmitted over a carrier may be made up of multiple subcarriers (e.g., using multi-carrier modulation (MCM) techniques such as orthogonal frequency division multiplexing (OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. In some aspects, a UE 115 may be configured with up to four downlink or uplink BWPs, and each BWP may be defined by a subcarrier spacing (SCS), a cyclic prefix (CP) length, a set of consecutive frequency domain resources, and a set of BWP dedicated parameters. As such, a BWP may be understood as or thought of as a part of a spectrum that encapsulates one or more parameters and is continuous in time while spanning only a portion of a system frequency bandwidth.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 and a base station 105 may use additional (e.g., higher) frequency ranges to achieve higher throughput. For example, the UE 115 and the base station 105 may communicate over relatively higher frequency ranges (e.g., such as frequency ranges used in FR2 radio frequency bands, including mmW frequency ranges, or FR4 radio frequency bands), and communication over such relatively higher frequency bands may enable the UE 115 and the base station 105 to communicate over relatively larger bandwidths.

For larger bandwidth operation, tradeoffs may exist between different waveform types based on operating conditions or constraints associated with the UE 115 or based on a deployment scenario of the UE 115 (e.g., tradeoffs between supported cell coverage area, supported throughput, implementation complexity, etc.). As such, which waveform type, along with other parameters, is desirable for use may vary across UEs 115 or for a same UE 115 over time (e.g., across different operating scenarios). Accordingly, in some implementations, the base station 105 (e.g., the network) may configure a quantity of transmission parts for the UE 115, each transmission part designated for communication using a specified waveform type and associated with a (potentially unique) set of communication parameters.

For example, in accordance with the configuration of the quantity of transmission parts, the UE 115 and the base station 105 may communicate via signaling that is based on a first waveform type and using a first set of communication parameters over a first transmission part and may communicate via signaling that is based on a second waveform type and using a second set of communication parameters over a second transmission part. In some implementations, the UE 115 and the base station 105 may support a switching from the communicating over the first transmission part to the communicating over the second transmission part in response to a pre-configured switch, activation signaling from the base station 105, or deactivation signaling from the base station 105.

Figure 2:
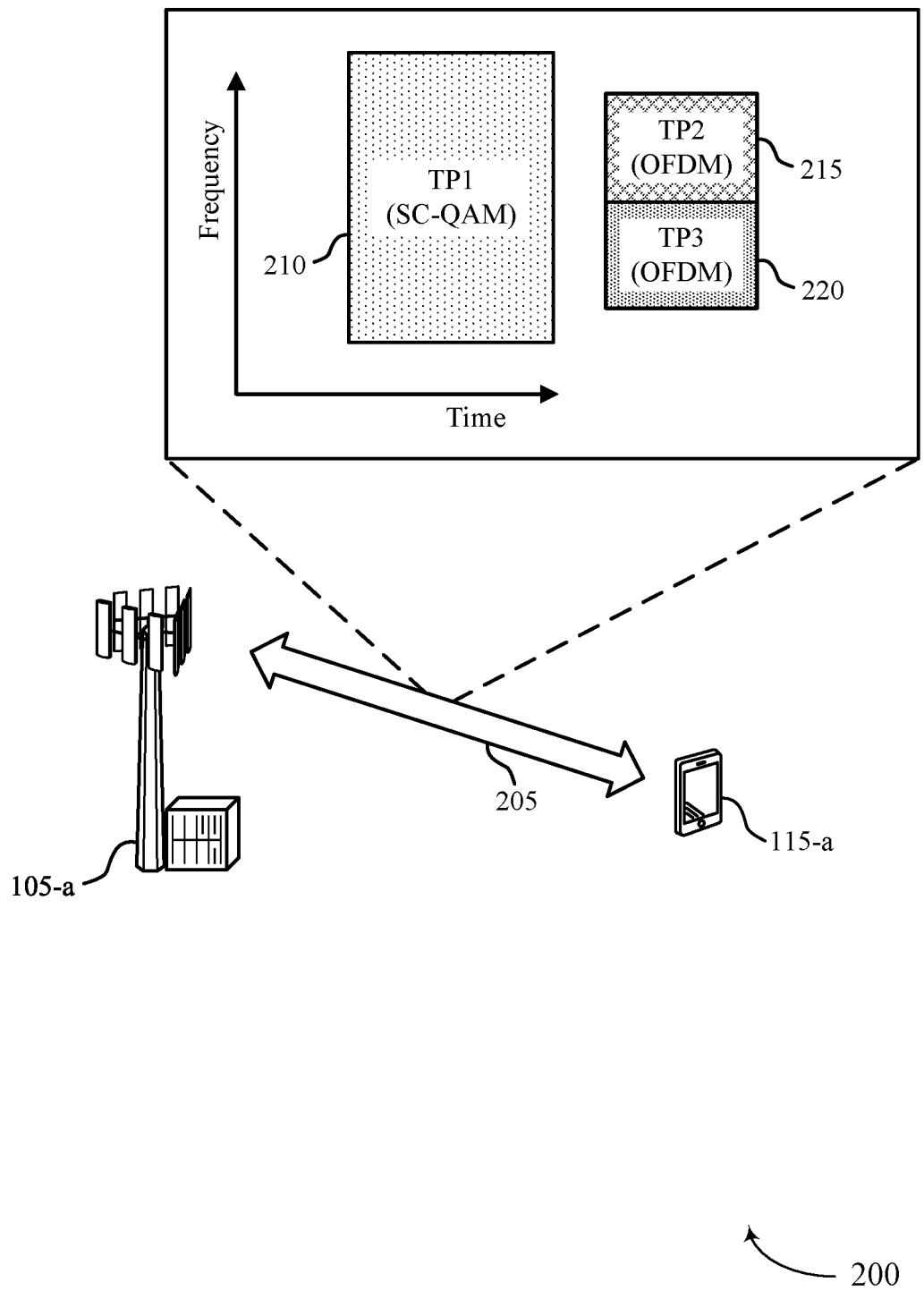

FIG. 2 illustrates an example of a wireless communications system 200 that supports waveform-specific transmission parts in accordance with aspects of the present disclosure. The wireless communications system 200 may implement or be implemented to realize aspects of the wireless communications system 100. For example, the wireless communications system 200 illustrates communication, via a communication link 205, between a UE 115-*a* and a base station 105-*a*, which may be examples of corresponding devices described herein, including with reference to FIG. 1. In some examples, the UE 115-*a* and the base station 105-*a* may communicate over one or more transmission parts that are each associated with a specified waveform type.

In some examples, such as in examples in which the wireless communications system 200 includes or is associated with an NR system, the UE 115-*a* and the base station 105-*a* may communicate over relatively higher frequency bands. For example, the UE 115-*a* and the base station 105-*a* may communicate over FR2 or FR4 radio frequency bands. In such higher band operation (e.g., if employing relatively higher NR operating bands), the UE 115-*a* and the base station 105-*a* may communicate over relatively larger bandwidths as compared to bandwidths at relatively lower frequency bands. In some aspects, the UE 115-*a* and the base station 105-*a* may experience an increase in an achievable throughput between the UE 115-*a* and the base station 105-*a* as a result of communicating over such relatively larger bandwidths.

Further (and for such larger bandwidth operation), the UE 115-*a* and the base station 105-*a* may communicate using a quantity of different waveform types. For example, the UE 115-*a* and the base station 105-*a* may communicate using a single-carrier frequency domain waveform, such as a DFT-s-OFDM waveform, a single-carrier time domain waveform, such as a single-carrier quadrature amplitude modulation (SC-QAM) waveform, or a multi-carrier frequency domain waveform, such as an OFDM waveform. If the UE 115-*a* and the base station 105-*a* communicate using a frequency domain waveform, such as a single-carrier or a multi-carrier frequency domain waveform, the UE 115-*a* and the base station 105-*a* may map symbols onto sub-carriers in the frequency domain using a discrete Fourier transform (DFT) spreading and may map from sub-carriers to symbols in the time domain using an inverse fast Fourier transform (IFFT). Alternatively, if the UE 115-*a* and the base station 105-*a* communicate using a time domain waveform, such as a single-carrier time domain waveform, the UE 115-*a* and the base station 105-*a* may refrain from performing sub-carrier mapping and simply use a wideband time domain transmission of the symbols. In some examples, such as in examples in which the UE 115-*a* and the base station 105-*a* communicate over relatively higher frequency bands, tradeoffs may exist between different waveform types based on an operating condition or constraint associated with the UE 115-*a* or a deployment scenario of the UE 115-*a*.

For example, communication using a single-carrier frequency domain waveform, such as a DFT-s-OFDM waveform, may be associated with a relatively lower peak-to-average power ratio (PAPR) as compared to other waveform types (e.g., multi-carrier waveform types, such as OFDM waveforms), which may be associated with a relatively greater coverage. For example, if the UE 115-*a* and the base station 105-*a* communicate using a single-carrier frequency domain waveform, the UE 115-*a* and the base station 105-*a* may use a relatively higher transmit power, which may provide a relatively greater coverage area, and push farther into non-linearity (while maintaining a sufficiently high signal quality) as compared to examples in which the UE 115-*a* and the base station 105-*a* communicate using a different waveform type (e.g., such as an OFDM waveform). Further, the UE 115-*a* or the base station 105-*a*, or both, may employ FDM or a single tap frequency domain equalization and may achieve a relatively more efficient bandwidth utilization in examples in which the UE 115-*a* and the base station 105-*a* communicate using a single-carrier frequency domain waveform. For example, if the UE 115-*a* and the base station 105-*a* communicate using a single-carrier frequency domain waveform, the UE 115-*a* and the base station 105-*a* may refrain from using a guard band to separate simultaneous transmissions, which may increase an available amount of bandwidth for other communication within the wireless communications system 200.

For further example, communication using a single-carrier time domain waveform, such as SC-QAM, may be associated with a relatively lower PAPR as compared to other waveform types (e.g., such as an OFDM waveform), which may be associated with a relatively greater coverage. For example, if the UE 115-*a* and the base station 105-*a* communicate using a single-carrier time domain waveform, the base station 105-*a* may provide a relatively greater coverage area as compared to examples in which the UE 115-*a* and the base station 105-*a* communicate using a different waveform type (e.g., such as an OFDM waveform). Further, implementation of a single-carrier time domain waveform may be associated with a relatively lower complexity as compared to other waveform types, as the UE 115-*a* and the base station 105-*a* may refrain from performing fast Fourier transform (FFT) and inverse FFT (IFFT) operations to support communication using a single-carrier time domain waveform.

For further example, communication using a multi-carrier frequency domain waveform (e.g., an OFDM waveform) may be associated with a relatively higher PAPR (and likewise a relatively lower coverage) as compared to other waveform types (e.g., such as single-carrier waveform types). As such, OFDM or other multi-carrier waveforms may, in some examples, be less suitable for relatively higher transmit powers, as deviation into non-linearity may significantly impact a signal quality. If the UE 115-*a* and the base station 105-*a* communicate using an OFDM or other multi-carrier waveform, however, the UE 115-*a* and the base station 105-*a* may experience a relatively higher SNR, a relatively greater spectral efficiency, and a relatively higher order MIMO capability to achieve relatively higher data rates as compared to other waveform types (e.g., such as single-carrier waveform types). Further, communication via an OFDM or other multi-carrier waveform type may be associated with a single tap frequency domain equalization, easier or lower complexity FDM capability, and relatively more efficient bandwidth utilization than some other waveform types (e.g., such as single-carrier time domain waveform types).

As such, different waveform types may be more or less suitable for different operating conditions or deployments of the UE 115-*a*. For example, one waveform type may be more or less suitable based on a location of the UE 115-*a* relative to the base station 105-*a*, based on an SNR experienced by the UE 115-*a* or the base station 105-*a*, based on a power limit or capability of the UE 115-*a*, or based on a MIMO capability of the UE 115-*a*, among other examples. For instance, if the UE 115-*a* is located relatively close to the base station 105-*a* or experiences operating conditions associated with a relatively higher channel quality (e.g., experiences a high SNR or multi-path rich channels), communication using an OFDM or other multi-carrier waveform may be more suitable than communication via a single-carrier waveform as the UE 115-*a* and the base station 105-*a* may use a relatively lower transmit power (such that the relatively higher PAPR associated with OFDM waveforms is less impactful) while leveraging the relatively greater spectral efficiency and higher data rates associated with multi-carrier waveforms. Further, in examples in which the UE 115-*a* is capable of using relatively higher order MIMO techniques (and is potentially not power limited), an OFDM or other multi-carrier waveform type may similarly be a more suitable waveform type.

Alternatively, if the UE 115-*a* is located relatively far away from the base station 105-*a* (e.g., such as at a cell edge) or experiences operating conditions associated with a relatively lower channel quality (e.g., experiences a relatively low SNR), communication using a single-carrier waveform type (e.g., DFT-s-OFDM or SC-QAM) may be more suitable than communication via an OFDM or other multi-carrier waveform as the UE 115-*a* and the base station 105-*a* may use a relatively higher transmit power (leveraging the relatively low PAPR associated with single-carrier waveforms). Further, in examples in which the UE 115-*a* is power limited or otherwise refrains from using MIMO communication techniques, a single-carrier waveform type may similarly be a more suitable waveform type.

In some examples, such as in examples in which the UE 115-*a* and the base station 105-*a* support higher band operation, the operating conditions or deployment scenarios of the UE 115-*a* may change according to relatively short timelines. As such, the UE 115-*a* and the base station 105-*a* may support mechanisms for changing between waveforms. For example, as a result of changing operating conditions, the UE 115-*a* and the base station 105-*a* may support a mechanism for dynamically changing the waveform type that the UE 115-*a* and the base station 105-*a* use for communication. In some examples, the UE 115-*a* and the base station 105-*a* may dynamically select or change a waveform type in accordance with one or more of a transmit power constraint, an FDM constraint, or a MIMO constraint.

As a result of such dynamic selection of waveform type in accordance with an operating condition, different UEs 115 may use different waveform types at a given time. For example, a combination between single-carrier (e.g., such as SC-QAM or DFT-s-OFDM) and multi-carrier (e.g., OFDM) waveforms may be used. In such examples, a first UE 115 and the base station 105-*a* using a single-carrier waveform may communicate over a time division multiplexed resource allocation, which may be incompatible with the frequency-based framework over which a second UE 115 and the base station 105-*a* may communicate if using an OFDM waveform. As such, the base station 105-*a* may experience added complexity for scheduling single-carrier-based communication along with multi-carrier-based communication within the wireless communications system 200 and, in some cases, increased interference between such different waveform types may arise as a result of such scheduling complexity.

In some cases, the base station 105-*a* may support a BWP concept to allow for UEs 115 with multiple bandwidth capabilities to operate within a same network (e.g., within the wireless communications system 200). The base station 105-*a* and the UE 115-*a* may support dynamic BWP switching (using downlink control information (DCI)) and the base station 105-*a* may define a BWP switching gap (based on UE capability) to provide sufficient time for the UE 115-*a* to adapt to a new set of parameters associated with a new BWP. Each BWP may be continuous in time, additionally or alternatively associated with the same waveform type, and additionally or alternatively only a single BWP may be active for the same UE 115 at any given time, each of which may limit the overall flexibility afforded to wireless communications system 200 by the use of BWPs alone.

Additionally, in some examples (such as in higher band operation), different UEs 115 may have different support or capabilities for various communication parameters. For example, different UEs 115 may have different support or capabilities for operating bandwidths, using a CP or a guard interval, waveform types, support of frequency domain equalization or time domain equalization (e.g., some UEs 115 may have FFT support while some other UEs 115 may feature a time domain only receiver), switching delays (e.g., between radio frequency chains, operating bandwidths, beams, etc.), or chip or sampling rates. To support such UEs 115 with diverse capabilities, the base station 105-*a* may, in some implementations, organize or pre-configure communication among one or more UEs 115 in accordance with the support or capabilities each of the one or more UEs 115 have for the various communication parameters.

In some examples, such organization or pre-configuration of communication between the one or more UEs 115, including the UE 115-*a*, and the base station 105-*a* may result in faster switching (e.g., between operating bandwidths, beams, waveform types, etc.) at both the one or more UEs 115 and the base station 105-*a*. For example, the UE 115-*a* and the base station 105-*a* may perform pre-configured switches (e.g., between operating bandwidths, beams, waveform types, etc.) with lower latency or according to shorter timelines than dynamic switches. Further, such organization or pre-configuration of communication between the one or more UEs 115 and the base station 105-*a* may enable a scheduler of the base station 105-*a* to allocate or schedule time domain resources (e.g., a time domain resource assignment (TDRA), delays, etc.) with lower complexity and, in some examples, such allocation or scheduling of time domain resources may increase the ability of the base station 105-*a* to manage interference between different waveforms. Accordingly, in some implementations of the present disclosure, the base station 105-*a* may organize or configure a framework to support multiple UEs 115 with different support or capabilities for various communication parameters as well as different support or capabilities for waveform types.

In some examples, the base station 105-*a* may implement such a framework based on configuring a set of transmission parts over which the base station 105-*a* may communicate with the UE 115-*a* (or one or more other UEs 115 in addition to the UE 115-*a*). The base station 105-*a* may define each transmission part of the set of transmission parts to be a set of time domain resources (or a set of time domain resource sets) or a set of frequency domain resources (or a set of frequency domain resource sets), or a combination thereof. In examples in which the base station 105-*a* defines a transmission part as a set of time domain resources or resource sets, the time domain resources or resource sets may be consecutive or distributed in time. Similarly, in examples in which the base station 105-*a* defines a transmission part as a set of frequency domain resources or resource sets, the frequency domain resources or resource sets may be consecutive or distributed in frequency.

The base station 105-*a* may configure each transmission part of the set of transmission parts such that each transmission part has or is otherwise associated with a (unique) set of parameters. For example, the base station 105-*a* may configure each transmission part to have or be associated with a waveform type, a CP or guard interval length, an SCS, a chip rate, a bandwidth, or switching times or durations, among other examples of communication parameters that may be dedicated to or defined for a set of time or frequency (or both) resources. As shown in FIG. 2, the set of transmission parts may include a first transmission part 210 (which may be equivalently referred to as a TP1), a second transmission part 215 (which may be equivalently referred to as a TP2), and a third transmission part 220 (which may be equivalently referred to as a TP3).

In some examples, the base station 105-*a* may configure the first transmission part 210 for communication using an SC-QAM waveform and may configure the second transmission part 215 and the third transmission part 220 for communication using an OFDM waveform. Further, the base station 105-a may additionally configure each of the first transmission part 210, the second transmission part 215, and the third transmission part 220 with settings for each of various communication parameters. Accordingly, the UE 115-a and the base station 105-a may communicate over each of one or more of the set of transmission parts using a waveform type that is designated for that transmission part and in accordance with the set of communication parameters associated with that transmission part.

In some implementations, the base station 105-a may, in addition to configuring the set of transmission parts for the UE 115-a, configure the UE 115-a with an initial transmission part that the UE 115-a may use to communicate with the base station 105-a. In some examples, the base station 105-a may configure the initial transmission part in system information, such as in system information block (SIB) 1, and the UE 115-a may likewise receive the configuration of the initial transmission part as a result of receiving system information from the base station 105-a. In some examples, the UE 115-a and the base station 105-a may communicate over the initial transmission part until other transmission parts are configured or activated for the UE 115-a.

For example, the base station 105-a may transmit the configuration of the set of transmission parts to the UE 115-a upon establishing a connection, such as an RRC connection, with the UE 115-a and, prior to the establishment of the connection, the UE 115-a and the base station 105-a may communicate over the initial transmission part. Additionally or alternatively, the UE 115-a may receive the system information including the indication of the initial transmission part after establishing the connection with the base station 105-a and may communicate with the base station 105-a over the initial transmission part until the UE 115-a receives signaling from the base station 105-a activating one or more of the set of configured transmission parts.

For example, the set of transmission parts that the base station 105-a configures at the UE 115-a may include one or more transmission parts and the base station 105-a may indicate, to the UE 115-a, which of the one or more transmission parts are active (e.g., usable by the UE 115-a). In some examples, for instance, the UE 115-a may receive, from the base station 105-a, an activation message activating at least a subset of the set of transmission parts that are configured at the UE 115-a. In examples in which the set of transmission parts includes the first transmission part 210, the second transmission part 215, and the third transmission part 220, for example, the UE 115-a may receive the activation message indicating the UE 115-a to activate one or more of the first transmission part 210, the second transmission part 215, or the third transmission part 220. The UE 115-a may, accordingly, communicate with the base station 105-a over one or more of the activated transmission parts. In some aspects, the UE 115-a may receive the activation message from the base station 105-a via DCI, a MAC control element (MAC-CE), or RRC signaling.

In some examples, the UE 115-a may additionally receive an indication of a default transmission part from the base station 105-a. Such a default transmission part may refer to a transmission part of the set of configured transmission parts (e.g., one of the first transmission part 210, the second transmission part 215, or the third transmission part 220) that the UE 115-a and the base station 105-a may use for communication if others (e.g., a remainder) of the set of configured transmission parts are deactivated (or are otherwise not active for use by the UE 115-a). In some examples, the UE 115-a may receive an indication of multiple default transmission parts such that the UE 115-a and the base station 105-a may communicate over any one or more of the multiple default transmission parts if others (e.g., a remainder) of the set of configured transmission parts are deactivated (or are otherwise not active for use by the UE 115-a). The UE 115-a may receive the indication of the default transmission part as part of the signaling conveying the configuration of the set of transmission parts or via separate signaling. In some examples, the default transmission part (or one of the multiple default transmission parts) may be the same as the initial transmission part. In some other examples, the default transmission part (or any of the multiple default transmission parts) may be different from the initial transmission part.

In some implementations, active transmission parts (e.g., transmission parts for which the UE 115-a receives an indication to activate via an activation message) may remain active indefinitely or for a limited time duration. In some examples, for instance, the UE 115-a may keep one or more active transmission parts in an active state (and may accordingly use those one or more activated transmission parts for communication with the base station 105-a) until the UE 115-a receives a deactivation message from the base station 105-a that explicitly deactivates one or more of the active transmission parts. In some aspects, the UE 115-a may receive the deactivation message from the base station 105-a via DCI, a MAC-CE, or RRC signaling.

Alternatively, in some other examples, the UE 115-a may receive a timer (or an indication of a duration of a timer) from the base station 105-a that is associated with one or more of the active transmission parts and the UE 115-a may deactivate the one or more of the active transmission parts that are associated with the timer upon expiration of the timer. In other words, the UE 115-a may keep the active transmission parts in an active state for the duration of the timer. As such, the UE 115-a (and the base station 105-a) may implicitly (e.g., without additional signaling) deactivate the active transmission parts upon expiration of the timer (e.g., after timer expiry). In both examples (for both explicit and implicit deactivation), the UE 115-a may fallback to using the default transmission part (or one of the multiple default transmission parts) or another transmission part that is still active.

Further, although shown as including three transmission parts, the set of transmission parts that the base station 105-a may configure for the UE 115-a (or for one or more UEs in addition to the UE 115-a) may include any quantity of transmission parts without exceeding the scope of the present disclosure. Additional details relating to such a set of configured transmission parts that are configured for multiple UEs are described herein, including with reference to FIG. 3.

Figure 3:
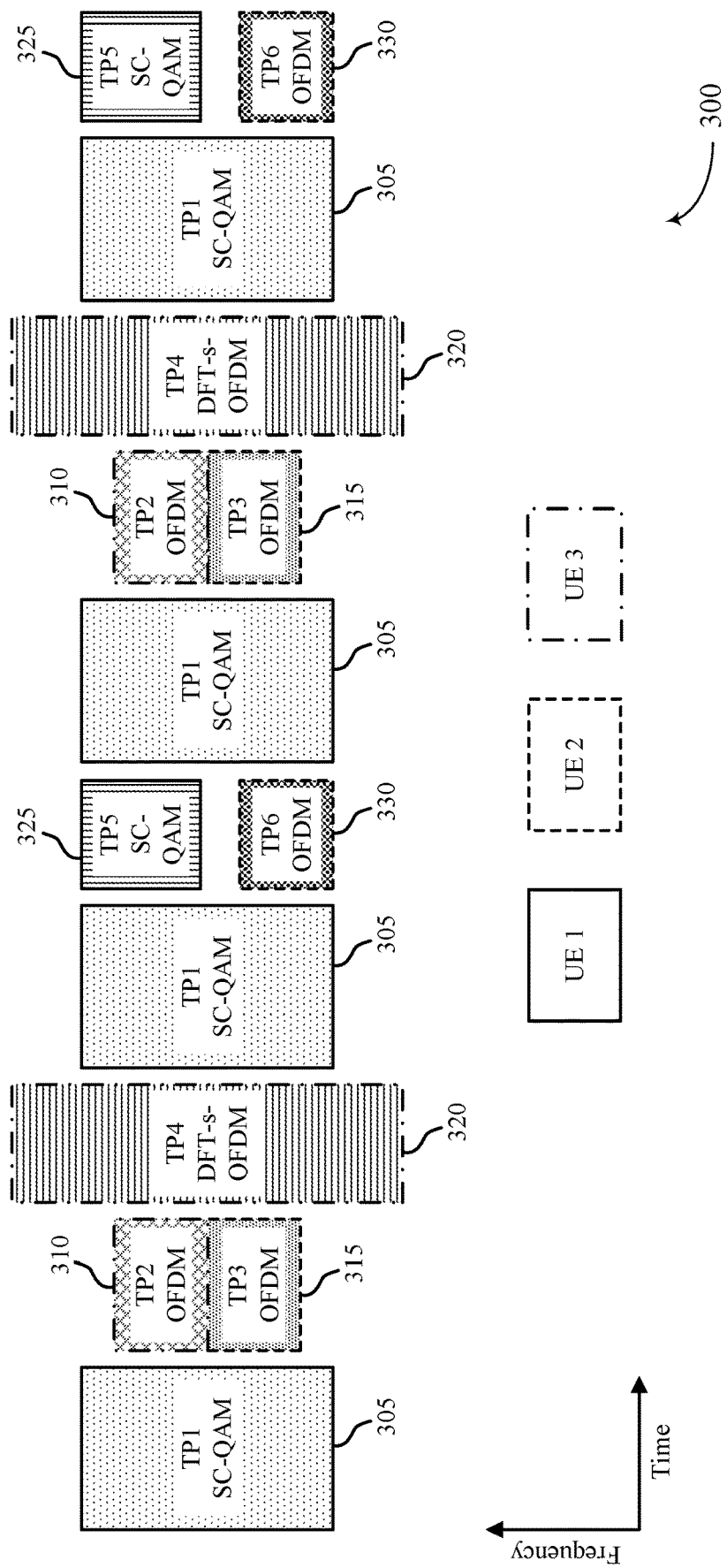
FIG. 3 illustrates an example of a communication timeline that supports waveform-specific transmission parts in accordance with aspects of the present disclosure.

FIG. 3 illustrates an example of a communication timeline 300 that supports waveform-specific transmission parts in accordance with aspects of the present disclosure. The communication timeline 300 may implement or be implemented to realize aspects of the wireless communications system 100 or the wireless communications system 200. For example, the communication timeline 300 may illustrate communication between a base station 105 and multiple UEs 115 (which may be examples of corresponding devices described herein, including with reference to FIGS. 1 and 2) over one or more transmission parts. In some examples, the base station 105 may configure a set of transmission parts over which the multiple UEs 115 may communicate with the base station 105 to organize or pre-configure waveform-specific communication over different sets of time or frequency resources.

For example, the base station 105 may configure a set of transmission parts including a first transmission part 305 (which may be equivalently referred to as a TP1), a second transmission part 310 (which may be equivalently referred to as a TP2), a third transmission part 315 (which may be equivalently referred to as a TP3), a fourth transmission part 320 (which may be equivalently referred to as a TP4), a fifth transmission part 325 (which may be equivalently referred to as a TP5), and a sixth transmission part 330 (which may be equivalently referred to as a TP6) and may transmit an indication of the set (or at least a subset) of configured transmission parts to a UE 115 (or multiple UEs 115). As described in more detail with reference to FIG. 2, each transmission part of the set of transmission parts may be associated with a (unique) set of communication parameters and each transmission part of the set of transmission parts may be associated with a designated or specified waveform type (such that communication over that transmission part uses the designated or specified waveform type).

For example, the first transmission part 305 may be associated with an SC-QAM waveform, the second transmission part 310 may be associated with an OFDM waveform, the third transmission part 315 may be associated with an OFDM waveform, the fourth transmission part 320 may be associated with a DFT-s-OFDM waveform, the fifth transmission part 325 may be associated with an SC-QAM waveform, and the sixth transmission part 330 may be associated with an OFDM waveform. Further, as illustrated by FIG. 3, the base station 105 may allocate different sets of transmission parts to different UEs 115. For example, the base station 105 may configure a first set of transmission parts including the first transmission part 305 and the fifth transmission part 325 for a first UE 115 (e.g., a UE 1), may configure a second set of transmission parts including the third transmission part 315 and the sixth transmission part 330 for a second UE 115 (e.g., a UE 2), and may configure a third set of transmission parts including the second transmission part 310 and the fourth transmission part 320 to a third UE 115 (e.g., a UE 3).

In some implementations, the set of transmission parts that the base station 105 configures for a UE 115 may include a set of uplink-specific transmission parts, a set of downlink-specific transmission parts, a set of transmission parts that are for both uplink communication and downlink communication, or any combination thereof. In some examples, for instance, the set of transmission parts may include a first subset of uplink-specific transmission parts that are associated with a set of uplink-specific communication parameters and a second subset of downlink-specific transmission parts that are associated with a set of downlink-specific communication parameters. In other words, the base station 105 may configure the set of transmission parts for the UE 115 such that the UE 115 and the base station may use any one of the first subset of uplink-specific transmission parts for uplink communication and any one of the second subset of downlink-specific transmission parts for downlink communication. Such uplink- or downlink-specific communication parameters may include any communication parameters that are dedicated or exclusive for either uplink communication or downlink communication or any communication parameters that may have different settings or values for uplink communication and downlink communication.

Additionally or alternatively, the set of transmission parts may include transmission parts that are associated with a set of communication parameters for both uplink communication and downlink communication. As such, the UE 115 and the base station 105 may communicate over such transmission parts that are associated with communication parameters for both uplink communication and downlink communication via uplink signaling or downlink signaling, or both. Such communication parameters may include any communication parameters that are common or shared between uplink communication or downlink communication. In other words, uplink and downlink transmission parts may be the same transmission parts and have the same communication parameters.

As illustrated by FIG. 3, a transmission part of the set of configured transmission parts may include or otherwise refer to a set of time domain resources (or time domain resource sets) or a set of frequency resources (or frequency domain resource sets), or both, and the time domain resources or the frequency domain resources of the transmission part may be consecutive or distributed in time. For example, the first transmission part 305 may cover a set of frequency resources and may include resources that are consecutive in time. For further example, the fifth transmission part 325 may include resources that are distributed in time. In other words, the fifth transmission part 325 may occupy a set of frequency domain resources and multiple time domain resource sets (such as multiple sets of symbols or slots). Other transmission parts of the set of transmission parts illustrated by FIG. 3 may similarly occupy frequency domain resources that are either consecutive or distributed in frequency or time domain resources that are consecutive or distributed in time.

In such examples in which the UE 115 and the base station 105 communicate over a transmission part that has time gaps or is otherwise discontinuous in time, the UE 115 and the base station 105 may define any communication timeline such that the communication timeline is transparent to the time gaps or accounts for the time gaps. In some implementations, for example, the UE 115 and the base station 105 may communicate in accordance with a communication timeline that is transparent to one or more time gaps associated with the transmission part. In such implementations, a UE 115 and the base station 105 may define any procedures, parameters, or counters (e.g., such as timers, scheduling delays, HARQ timelines, etc.) such that the procedures, parameters, or counters ignore the time gaps (e.g., treat the one or more time gaps as non-existent, do not continue counting during the time gaps, or do not reset upon the occurrence of a time gap). For example, a counter or a timer may run while the first UE 115 and the base station 105 communicate over a first (time domain) occasion of the fifth transmission part 325, may pause between the first occasion of the fifth transmission part 325 and a second occasion of the fifth transmission part 325, and may resume running while the first UE 115 and the base station 105 communicate over the second occasion of the fifth transmission part 325.

Alternatively, in some other implementations, a UE 115 and the base station 105 may communicate in accordance with a communication timeline that accounts for the one or more time gaps of the transmission part. In such implementations, the UE 115 and the base station 105 may define any procedures, parameters, or counters (e.g., such as timers, scheduling delays, HARQ timelines, etc.) such that the procedures, parameters, or counters account for the one or more time gaps of the transmission part. For example, a counter or a timer may run while the first UE 115 and the base station 105 communicate over the first occasion of the fifth transmission part 325, may continue to run between the first occasion of the fifth transmission part 325 and the second occasion of the fifth transmission part 325, and may continue to run while the UE 115 and the base station 105 communicate over the second occasion of the fifth transmission part 325.

Further, a UE 115 may feature one or more rules or procedures for communicating outside of an active transmission part. For example, the UE 115 may receive a grant for a set of resources outside of one or more active transmission parts and, in some implementations, may communicate with the base station 105 over the set of resources that is outside of the one or more active transmission parts (e.g., in accordance with a rule or procedure). Alternatively, in some other implementations, the UE 115 may refrain from communicating with the base station 105 over the set of resources that is outside of the one or more active transmission parts (e.g., in accordance with a rule or procedure).

Such rules or procedures may define whether the UE 115 is allowed to communicate (e.g., transmit or receive) outside of the one or more transmission parts that are active for the UE 115, and such rules or procedures may be standardly configured (e.g., may be pre-configured at the UE 115) or may be signaled to the UE 115 from the base station 105. For example, the UE 115 may determine whether the UE 115 is allowed to communicate over resources outside of the one or more active transmission parts based on a pre-configured or standardly configured rule or based on an indication or configuration that the UE 115 may receive from the base station 105. In some implementations, the base station 105 may determine whether to transmit a grant for a set of resources to the UE 115 in accordance with the rule or procedure indicating whether the UE 115 is allowed to communicate over resources that are outside of the one or more transmission parts that are active for the UE 115. In some examples, for instance, the base station 105 may refrain from transmitting a grant for a set of resources to the UE 115 if the UE 115 is prohibited or otherwise not allowed to communicate over resources outside of the one or more transmission parts that are active for the UE 115.

In some aspects, the base station 105 may configure one or more guard bands between some transmission parts of the set of transmission parts. As such, some transmission parts, such as the fifth transmission part 325 and the sixth transmission part 330, may be separated by a frequency range (e.g., to mitigate interference between signaling sent over the transmission parts). For example, the base station 105 may configure a guard band between the fifth transmission part 325 and the sixth transmission part 330 (which may overlap in time) because SC-QAM-based signaling may potentially interfere with OFDM-based signaling. For similar reasons, the base station 105 may refrain from configuring a guard band between the second transmission part 310 and the third transmission part 315 (which also overlap in time) because both the second transmission part 310 and the third transmission part 315 feature OFDM-based signaling that can be multiplexed to avoid interference.

Additionally or alternatively, the base station 105 may configure one or more switching gaps between some transmission parts of the set of transmission parts. As such, some transmission parts may be separated by a duration of time to allow for switching between the transmission parts. In some examples, the switching gaps that the base station 105 may configure between transmission parts may provide sufficient time for a UE 115 and the base station 105 to make adjustments associated with switching from communicating over one transmission part to communicating over a different transmission part.

For instance, in examples in which the first transmission part 305 and the fifth transmission part 325 are active (or become active) for the first UE 115, the first UE 115 and the base station 105 may communicate for a first time period over the first transmission part 305 via signaling that is based on an SC-QAM waveform and in accordance with a first set of communication parameters associated with the first transmission part 305 and may communicate for a second time period over the fifth transmission part 325 via signaling that is based on an SC-QAM waveform and in accordance with a second set of communication parameters associated with the fifth transmission part 325. As such, the first UE 115 and the base station 105 may make one or more adjustments during a switching gap between the first transmission part 305 and the fifth transmission part 325 to support the switching from communicating in accordance with the first set of communication parameters to communicating in accordance with the second set of communication parameters.

For further example, in examples in which the second transmission part 310 and the fourth transmission part 320 are active (or become active) for the third UE 115, the third UE 115 and the base station 105 may communicate for a first time period over the second transmission part 310 via signaling that is based on an OFDM waveform and in accordance with a first set of communication parameters associated with the second transmission part 310 and may communicate for a second time period over the fourth transmission part 320 via signaling that is based on a DFT-s-OFDM waveform and in accordance with a second set of communication parameters associated with the fourth transmission part 320. As such, the third UE 115 and the base station 105 may make one or more adjustments during a switching gap between the second transmission part 310 and the fourth transmission part 320 to support the switching from the communicating via an OFDM waveform to communicating via a DFT-s-OFDM waveform and to support the switching from communicating in accordance with the first set of communication parameters to communicating in accordance with the second set of communication parameters.

In some examples, a UE 115 may receive activation signaling from the base station 105 activating multiple transmission parts for the UE 115 at the same time or the UE 115 may otherwise have more than one active transmission part at a time (e.g., such that the UE 115 may have multiple active transmission parts concurrently or simultaneously). In such aspects, both the first transmission part 305 and the fifth transmission part 325 may be active transmission parts for the first UE 115 and the first UE 115 may switch from communicating with the base station 105 over the first transmission part 305 to communicating with the base station 105 over the fifth transmission part 325 during the switching gap in accordance with having both the first transmission part 305 and the fifth transmission part 325 as active transmission parts. In some other examples, the first UE 115 may receive a deactivation message for the first transmission part 305 and an activation message for the fifth transmission part 325 and may switch from communicating with the base station 105 over the first transmission part 305 to communicating with the base station 105 over the fifth transmission part 325 during the switching gap in accordance with the activation and deactivation signaling.

For further example, both the second transmission part 310 and the fourth transmission part 320 may be active transmissions for the third UE 115 and the third UE 115 may switch from communicating with the base station 105 over the second transmission part 310 to communicating with the base station 105 over the fourth transmission part 320 during the switching gap in accordance with having both the second transmission part 310 and the fourth transmission part 320 as active transmission parts. In some other examples, the third UE 115 may receive a deactivation message for the second transmission part 310 and an activation message for the fourth transmission part 320 and may switch from communicating with the base station 105 over the second transmission part 310 to communicating with the base station 105 over the fourth transmission part 320 during the switching gap in accordance with the activation and deactivation signaling.

As such, the base station 105 may effectively encapsulate different waveform types in various transmission parts and configure the various transmission parts to support efficient allocation of different transmission parts to different UEs 115, to support low-latency switching between transmission parts for a single UE 115, and to efficiently avoid interference between different waveform types as a result of such organization or configuration of the various transmission parts. For example, based on activating and deactivating one or more transmission parts for a UE 115 within a set of transmission parts that are configured for that UE 115, the base station 105 may avoid allocating resources for communication via one waveform type that would be likely to experience interference from (or cause interference to) other communication as a result of a waveform type, a set of communication parameters, or a resource allocation associated with that other communication.

Figure 4:
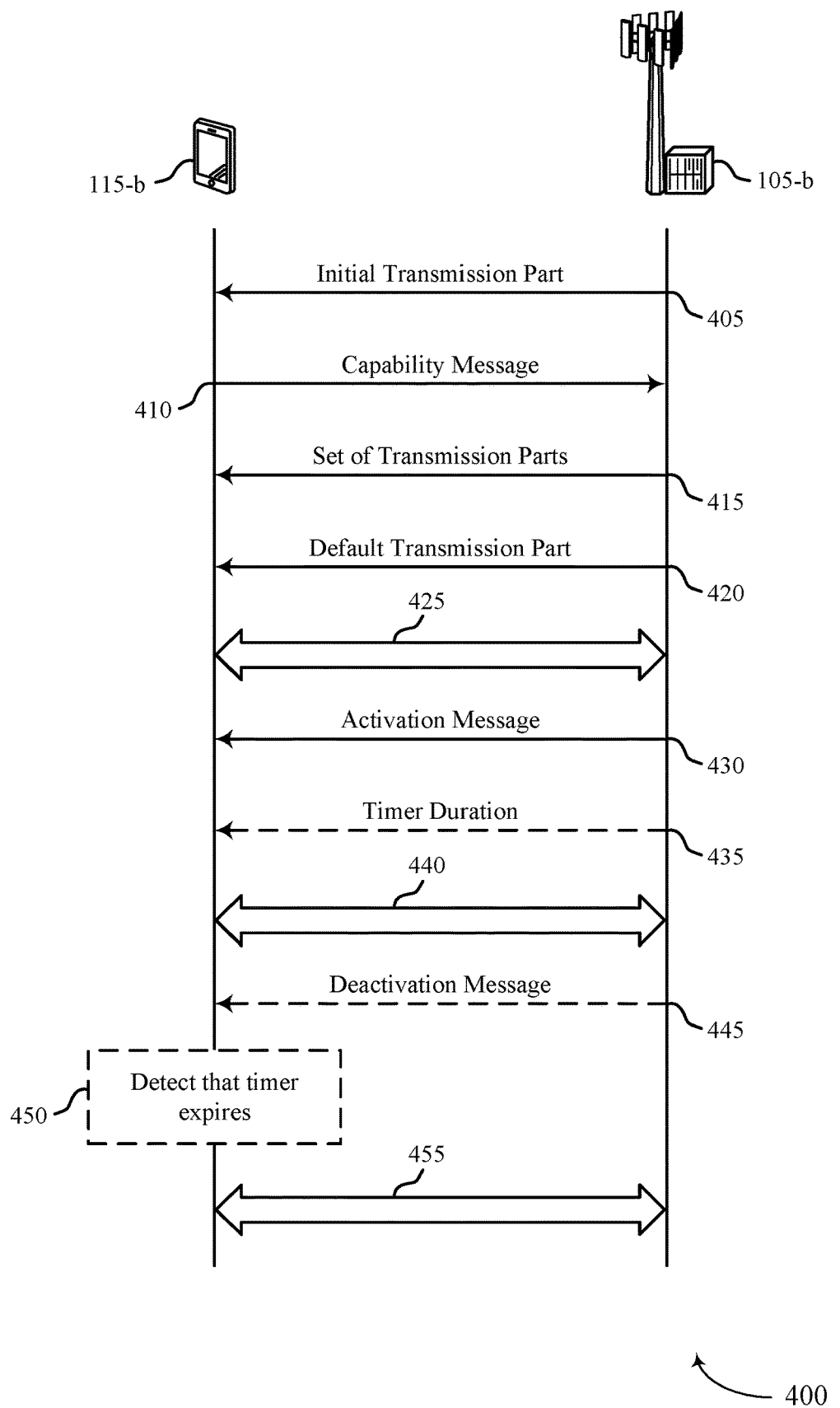
FIG. 4 illustrates an example of a process flow that supports waveform-specific transmission parts in accordance with aspects of the present disclosure.

FIG. 4 illustrates an example of a process flow 400 that supports waveform-specific transmission parts in accordance with aspects of the present disclosure. The process flow 400 may implement or be implemented to realize aspects of the wireless communications system 100, the wireless communications system 200, or the communication timeline 300. For example, the process flow 400 illustrates communication between a UE 115-b and a base station 105-b, which may be examples of corresponding devices described herein, including with reference to FIGS. 1 through 3. In some examples, the base station 105-b may configure a set of transmission parts over which the multiple UEs 115-b may communicate with the base station 105-b to organize or pre-configure waveform-specific communication over different sets of time or frequency resources.

In the following description of the process flow 400, the operations may be performed (for example, reported or provided) in a different order than the order shown, or the operations performed by the UE 115-b and the base station 105-b may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

At 405, the UE 115-b may receive a SIB from the base station 105-b including a configuration of an initial transmission part. In some examples, the UE 115-b and the base station 105-b may communicate using the initial transmission part until the UE 115-b is configured with or receives activation signaling associated with other transmission parts. In some aspects, the initial transmission part may include different time or frequency resources than other transmission parts that may be configured at the UE 115-b and may be associated with a designated or specified waveform type.

At 410, the UE 115-b may transmit, to the base station 105-b, a capability message indicating a set of waveform types that the UE 115-b is capable of using. In some examples, the UE 115-b may receive a configuration of a set of transmission parts based on or in accordance with the set of waveform types that the UE 115-b is capable of using.

At 415, the UE 115-b may receive, from the base station 105-b, an indication of a set of transmission parts that each include a different set of time resources or a different set of frequency resources, or both. In some examples, the indication of the set of transmission parts associates a first transmission part of the set of transmission parts with a first waveform type and a second transmission part of the set of transmission parts with a second waveform type. In some aspects, the set of transmission parts that the base station 105-b configures for the UE 115-b may be based on or in accordance with the set of waveform types that the UE 115-b is capable of using.

At 420, the UE 115-b may receive an indication of a default transmission part of the set of transmission parts. In some examples, the default transmission part may be the first transmission part that is associated with the first waveform type. In some implementations, the UE 115-b and the base station 105-b may treat the default transmission part as a fallback transmission part such that the UE 115-b and the base station 105-b may communicate over the default transmission part if others of the set of transmission parts that are configured at the UE 115-b are inactive.

At 425, the UE 115-b and the base station 105-b may communicate, during a first time period, over the first transmission part via signaling that is based on the first waveform type. For example, the UE 115-b and the base station 105-b may communicate using the first transmission part (e.g., the default transmission part) prior to an activation of others of the set of transmission parts that are configured at the UE 115-b.

At 430, the UE 115-b may receive, from the base station 105-b, an activation message for one or more transmission parts of the set of transmission parts. In some examples, the one or more transmission parts associated with the activation message may include the second transmission part that is associated with the second waveform type.

At 435, the UE 115-b may, in some implementations, receive an indication of a duration of a timer associated with the one or more transmission parts activated by the activation message. In such implementations in which the UE 115-b receives the indication of the duration of the timer, the UE 115-b may determine that the one or more transmission parts may be active for the duration of the timer and may be inactive after expiry of the timer.

At 440, the UE 115-b and the base station 105-b may communicate, during a second time period after the first time period, over the second transmission part via signaling that is based on the second waveform type. In some examples, the UE 115-b and the base station 105-b may switch from communicating over the first transmission part to communicating over the second transmission part based on or as a result of receiving the activation message for the one or more transmission parts including the second transmission part.

At 445, the UE 115-b may, in some implementations, receive a deactivation message for the one or more transmission parts of the set of transmission parts. In such implementations, the UE 115-b may deactivate the one or more transmission parts upon reception of the deactivation message or after some delay measured from the reception of the deactivation message.

At 450, the UE 115-b may, in some implementations, detect that the timer (the duration of which was signaled at 435) expires. In such implementations, the UE 115-b may deactivate the one or more transmission parts upon detecting that the timer expires.

At 455, the UE 115-b may switch from communicating with the base station 105-b over the second transmission part associated with the second waveform type to communicating with the base station 105-b over the first transmission type associated with the first waveform type or a third transmission part associated with a third waveform type. In some examples, the UE 115-b and the base station 105-b may switch from the second transmission part as a result of receiving the deactivation message at 445 or detecting that the timer expires at 450. In some examples, UE 115-b and the base station 105-b may switch to the first transmission part (e.g., the default transmission part) if no other transmission parts remain active or may switch to the third transmission part if the third transmission part is another transmission part of the set of transmission parts configured for the UE 115-b that remains active.

Figure 5:
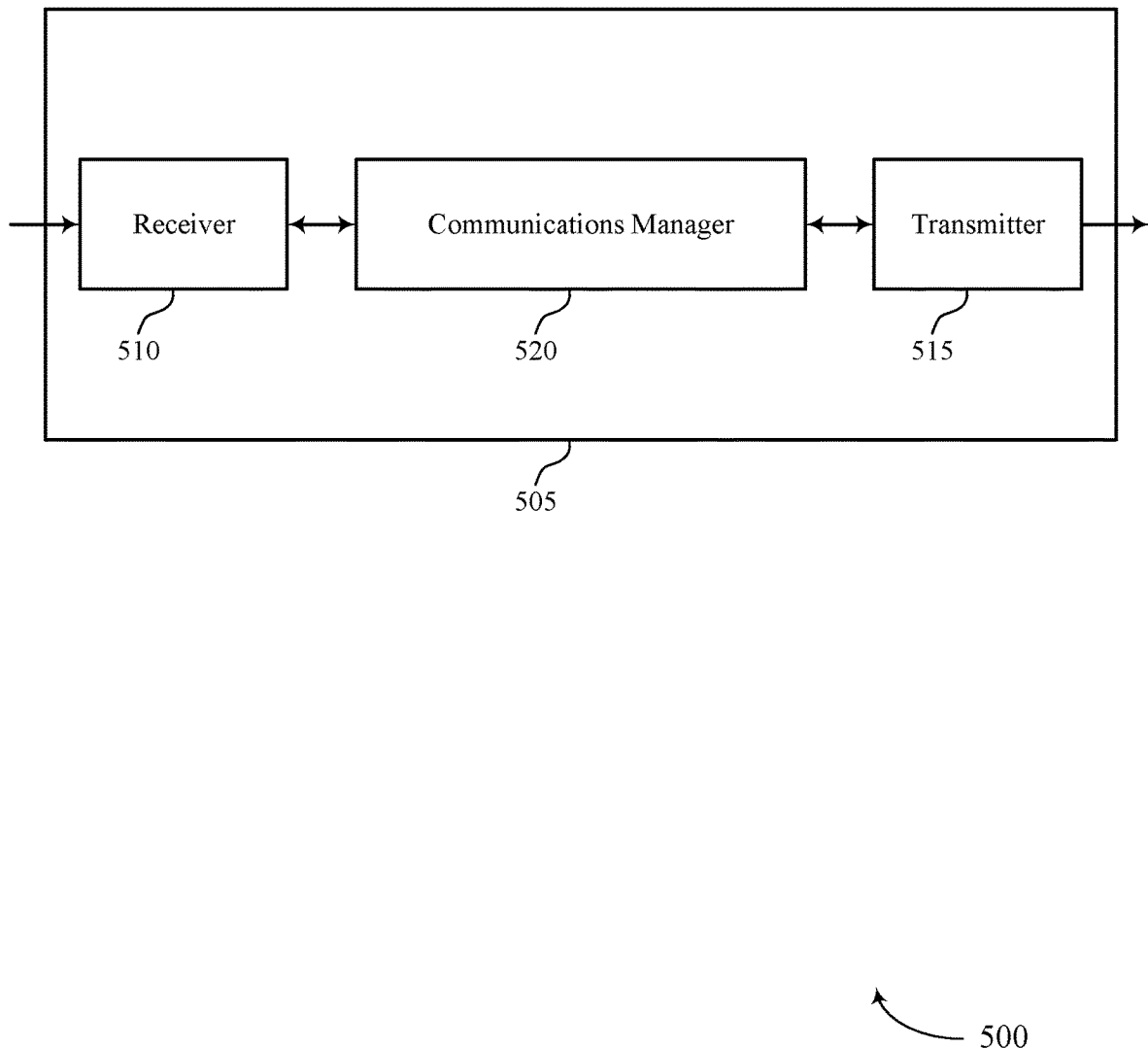
FIGS. 5 and 6 show block diagrams of devices that support waveform-specific transmission parts in accordance with aspects of the present disclosure.

FIG. 5 shows a block diagram 500 of a device 505 that supports waveform-specific transmission parts in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to waveform-specific transmission parts). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to waveform-specific transmission parts). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of waveform-specific transmission parts as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The communications manager 520 may be configured as or otherwise support a means for communicating with the base station, during a first time period, over the first transmission part via signaling that is based on the first waveform type. The communications manager 520 may be configured as or otherwise support a means for communicating with the base station, during a second time period after the first time period, over the second transmission part via signaling that is based on the second waveform type.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources.

Figure 6:
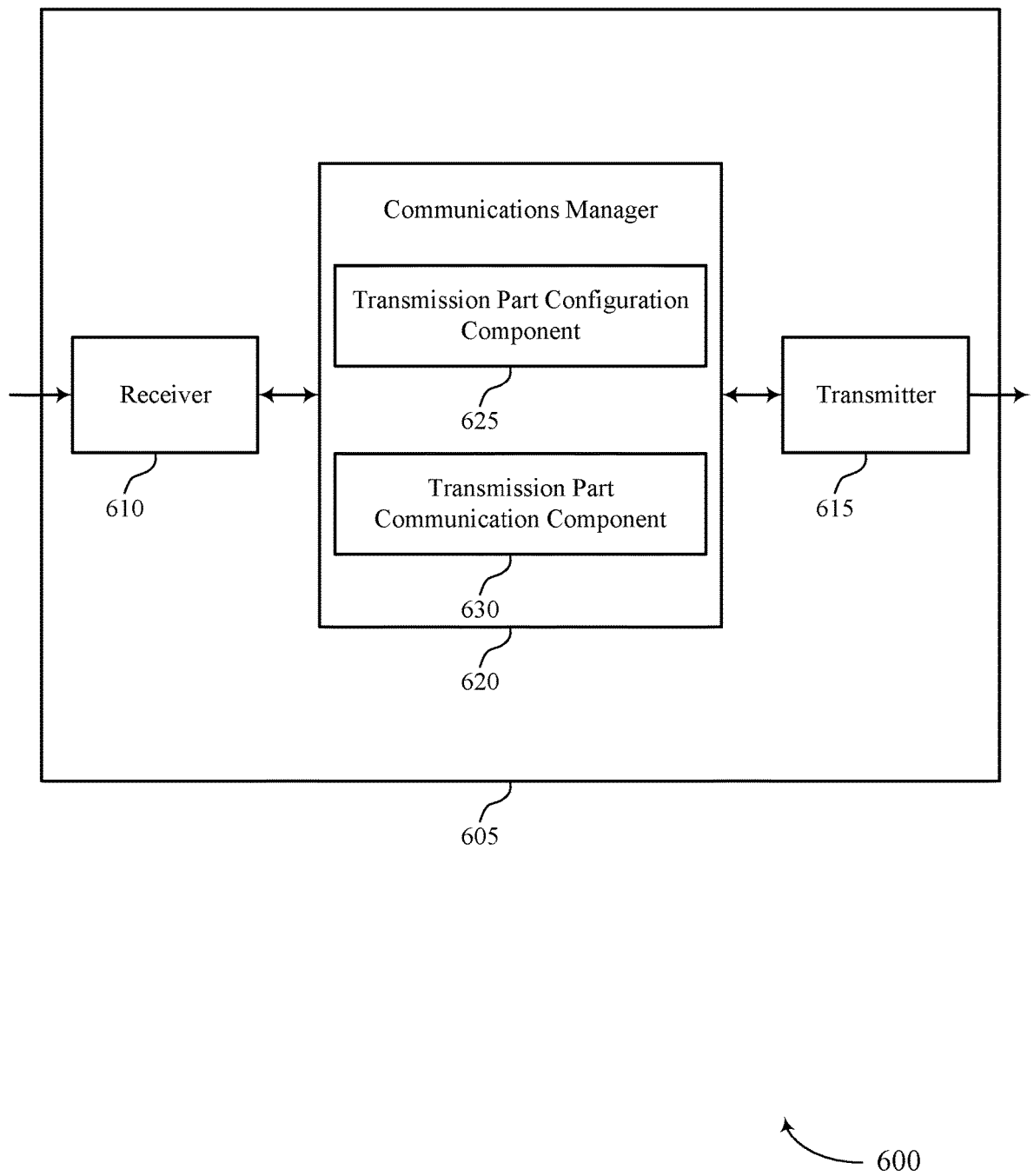

FIG. 6 shows a block diagram 600 of a device 605 that supports waveform-specific transmission parts in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to waveform-specific transmission parts). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to waveform-specific transmission parts). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of waveform-specific transmission parts as described herein. For example, the communications manager 620 may include a transmission part configuration component 625 a transmission part communication component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The transmission part configuration component 625 may be configured as or otherwise support a means for receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The transmission part communication component 630 may be configured as or otherwise support a means for communicating with the base station, during a first time period, over the first transmission part via signaling that is based on the first waveform type. The transmission part communication component 630 may be configured as or otherwise support a means for communicating with the base station, during a second time period after the first time period, over the second transmission part via signaling that is based on the second waveform type.

Figure 7:
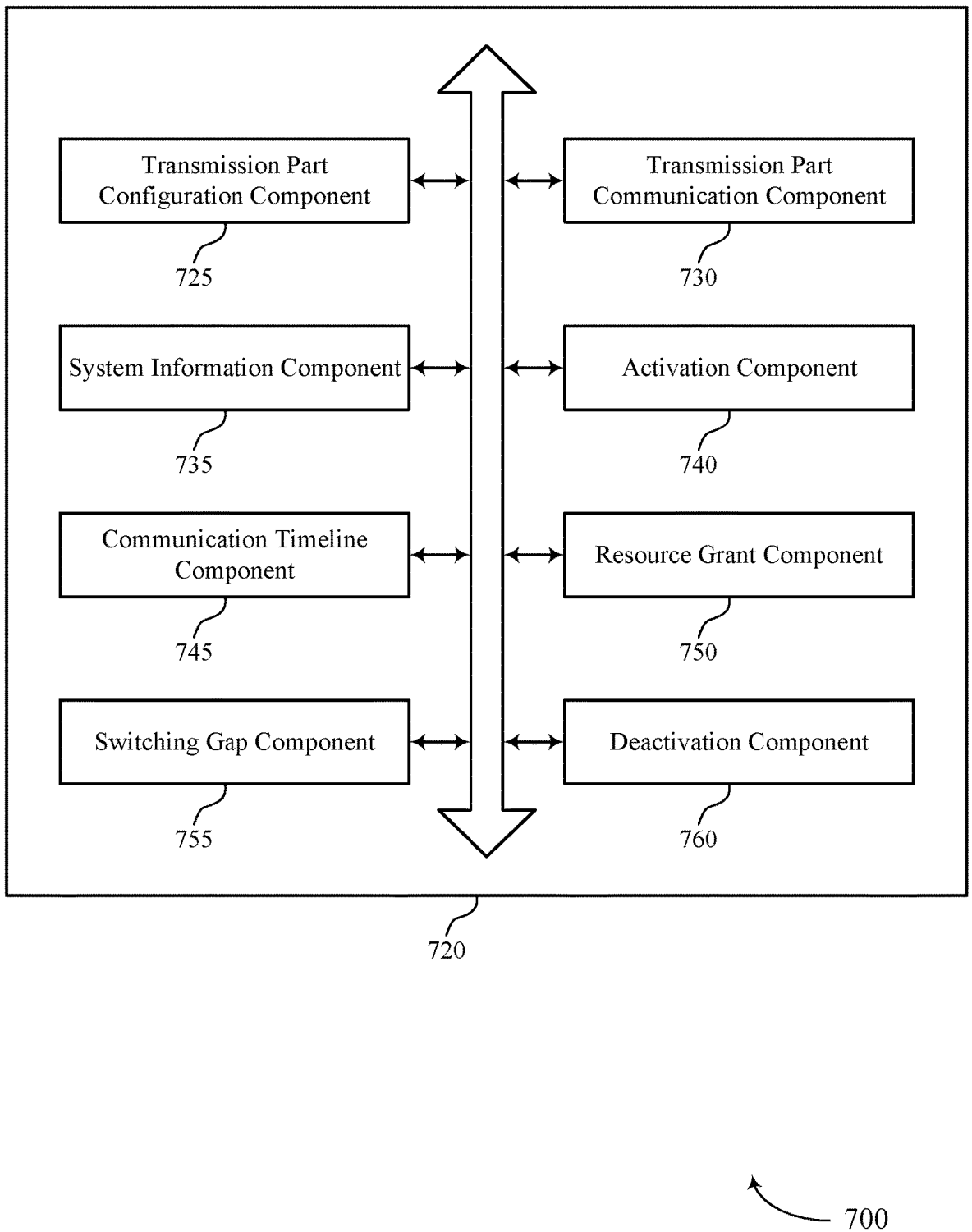
FIG. 7 shows a block diagram of a communications manager that supports waveform-specific transmission parts in accordance with aspects of the present disclosure.

FIG. 7 shows a block diagram 700 of a communications manager 720 that supports waveform-specific transmission parts in accordance with aspects of the present disclosure. The communications manager 720 may be an example of aspects of a communications manager 520, a communications manager 620, or both, as described herein. The communications manager 720, or various components thereof, may be an example of means for performing various aspects of waveform-specific transmission parts as described herein. For example, the communications manager 720 may include a transmission part configuration component 725, a transmission part communication component 730, a system information component 735, an activation component 740, a communication timeline component 745, a resource grant component 750, a switching gap component 755, a deactivation component 760, or any combination thereof. Each of these components may communicate, directly or indirectly, with one another (e.g., via one or more buses).

The communications manager 720 may support wireless communication at a UE in accordance with examples as disclosed herein. The transmission part configuration component 725 may be configured as or otherwise support a means for receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The transmission part communication component 730 may be configured as or otherwise support a means for communicating with the base station, during a first time period, over the first transmission part via signaling that is based on the first waveform type. In some examples, the transmission part communication component 730 may be configured as or otherwise support a means for communicating with the base station, during a second time period after the first time period, over the second transmission part via signaling that is based on the second waveform type.

In some examples, the system information component 735 may be configured as or otherwise support a means for receiving an SIB including a configuration of an initial transmission part different than the first transmission part and the second transmission part, where the SIB associates the initial transmission part with an initial waveform type that may be the first waveform type, the second waveform type, or a third waveform type. In some examples, the transmission part communication component 730 may be configured as or otherwise support a means for communicating with the base station over the initial transmission part via signaling that is based on the initial waveform type before the first time period.

In some examples, the transmission part configuration component 725 may be configured as or otherwise support a means for receiving an indication of a default transmission part of the set of transmission parts, where the default transmission part includes the first transmission part and the communicating with the base station over the first transmission part during the first time period is based on the indication of the default transmission part.

In some examples, the activation component 740 may be configured as or otherwise support a means for receiving, from the base station, an activation message for one or more transmission parts of the set of transmission parts including the second transmission part, where the communicating over the second transmission part associated with the second waveform type is based on the activation message.

In some examples, the deactivation component 760 may be configured as or otherwise support a means for receiving, from the base station, a deactivation message for the one or more transmission parts of the set of transmission parts. In some examples, the transmission part communication component 730 may be configured as or otherwise support a means for switching, based on the deactivation message, from communicating with the base station over the second transmission part associated with the second waveform type to communicating with the base station over the first transmission part associated with the first waveform type or to communicating with the base station over a third transmission part associated with a third waveform type.

In some examples, the deactivation component 760 may be configured as or otherwise support a means for receiving, from the base station, an indication of a duration for a timer associated with the one or more transmission parts of the set of transmission parts, where the one or more transmission parts each become deactivated for the UE upon expiration of the timer. In some examples, the transmission part communication component 730 may be configured as or otherwise support a means for switching, based on the expiration of the timer, from communicating with the base station over the second transmission part associated with the second waveform type to communicating with the base station over the first transmission part associated with the first waveform type or to communicating with the base station over a third transmission part associated with a third waveform type.

In some examples, the first transmission part and the second transmission part are concurrently active for the UE.

In some examples, the set of transmission parts may include a set of uplink-specific transmission parts associated with a set of uplink-specific communication parameters. In some examples, the set of transmission parts may include a set of downlink-specific transmission parts associated with a set of downlink-specific communication parameters.

In some examples, each transmission part of the set of transmission parts is for both uplink communication and downlink communication. In some examples, the indication associates each transmission part of the set of transmission parts with a respective set of communication parameters that are common for the uplink communication and the downlink communication.

In some examples, at least one of the first transmission part and the second transmission part is discontinuous in time. In such examples, to support communicating with the base station over the first transmission part or the second transmission part, the communication timeline component 745 may be configured as or otherwise support a means for communicating in accordance with a communication timeline that is transparent to one or more time gaps associated with at least one of the first transmission part and the second transmission part being discontinuous in time.

In some examples, at least one of the first transmission part and the second transmission part is discontinuous in time. In such examples, to support communicating with the base station over the first transmission part or the second transmission part, the communication timeline component 745 may be configured as or otherwise support a means for communicating in accordance with a communication timeline that accounts for one or more time gaps associated with at least one of the first transmission part and the second transmission part being discontinuous in time.

In some examples, the resource grant component 750 may be configured as or otherwise support a means for receiving, from the base station, a grant for a transmission resource outside of one or more active transmission parts of the set of transmission parts. In some examples, the resource grant component 750 may be configured as or otherwise support a means for communicating with the base station, based on the grant, via the transmission resource that is outside of the one or more active transmission parts.

In some examples, the resource grant component 750 may be configured as or otherwise support a means for receiving, from the base station, a grant for a transmission resource outside of one or more active transmission parts of the set of transmission parts. In some examples, the resource grant component 750 may be configured as or otherwise support a means for refraining from communicating with the base station, based on the grant, via the transmission resource that is outside of the one or more active transmission parts.

In some examples, the switching gap component 755 may be configured as or otherwise support a means for receiving, from the base station, a configuration of one or more switching gaps or one or more guard bands each between a respective pair of transmission parts within the set of transmission parts. In some examples, the switching gap component 755 may be configured as or otherwise support a means for switching, during a switching gap of the one or more switching gaps, from communicating with the base station over the first transmission part associated with the first waveform type to communicating with the base station over the second transmission part associated with the second waveform type.

In some examples, the transmission part configuration component 725 may be configured as or otherwise support a means for transmitting, to the base station, a capability message indicating a set of waveform types that the UE is capable of using, where the indication of the set of transmission parts is based on the capability message.

In some examples, the respective set of time resources and frequency resources for a transmission part of the set of transmission parts may be discontinuous in time, discontinuous in frequency, or discontinuous in both time and frequency.

In some examples, the first waveform type includes a first one of a single-carrier frequency domain waveform, a single-carrier time domain waveform, or a multi-carrier waveform. In some examples, the second waveform type includes a second one of the single-carrier frequency domain waveform, the single-carrier time domain waveform, or the multi-carrier waveform.

Figure 8:
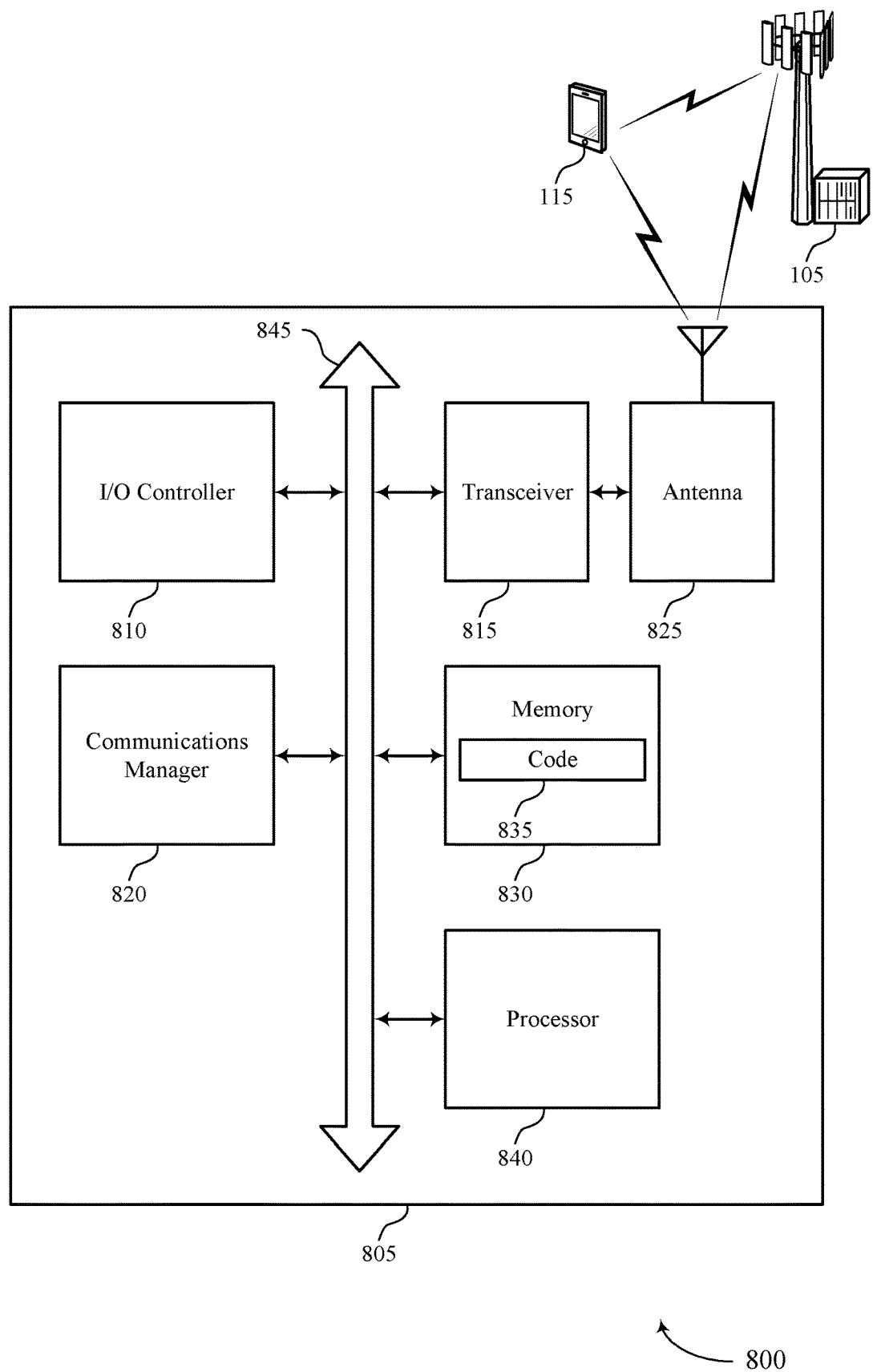
FIG. 8 shows a diagram of a system including a device that supports waveform-specific transmission parts in accordance with aspects of the present disclosure.

FIG. 8 shows a diagram of a system 800 including a device 805 that supports waveform-specific transmission parts in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting waveform-specific transmission parts). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The communications manager 820 may be configured as or otherwise support a means for communicating with the base station, during a first time period, over the first transmission part via signaling that is based on the first waveform type. The communications manager 820 may be configured as or otherwise support a means for communicating with the base station, during a second time period after the first time period, over the second transmission part via signaling that is based on the second waveform type.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of waveform-specific transmission parts as described herein, or the processor 840 and the memory 830 may be otherwise configured to perform or support such operations.

Figure 9:
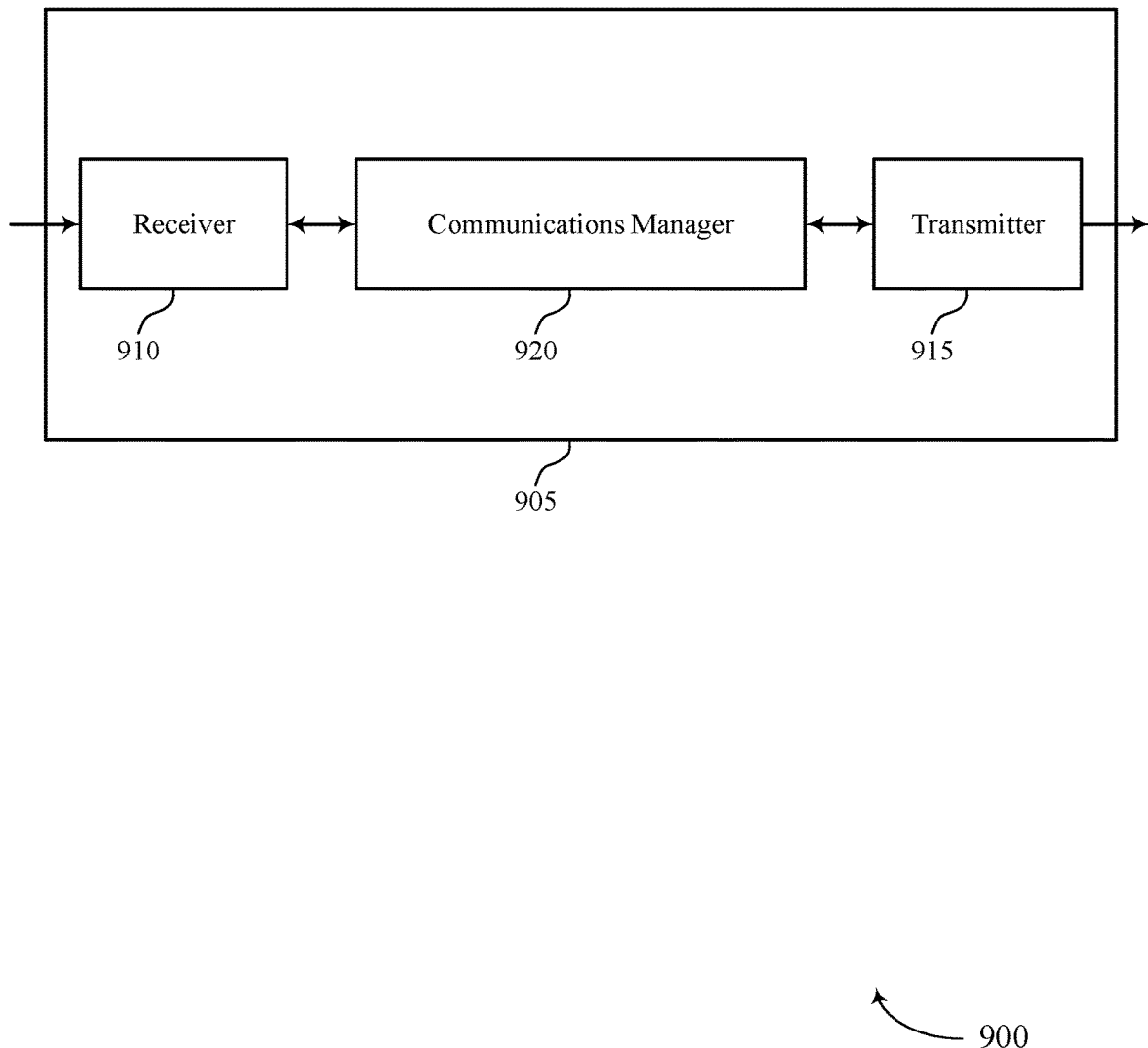
FIGS. 9 and 10 show block diagrams of devices that support waveform-specific transmission parts in accordance with aspects of the present disclosure.

FIG. 9 shows a block diagram 900 of a device 905 that supports waveform-specific transmission parts in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to waveform-specific transmission parts). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to waveform-specific transmission parts). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of waveform-specific transmission parts as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The communications manager 920 may be configured as or otherwise support a means for communicating with the UE, during a first period, over the first transmission part via signaling that is based on the first waveform type. The communications manager 920 may be configured as or otherwise support a means for communicating with the UE, during a second time period after the first time period, over the second transmission part via signaling that is based on the second waveform type.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption and more efficient utilization of communication resources.

Figure 10:
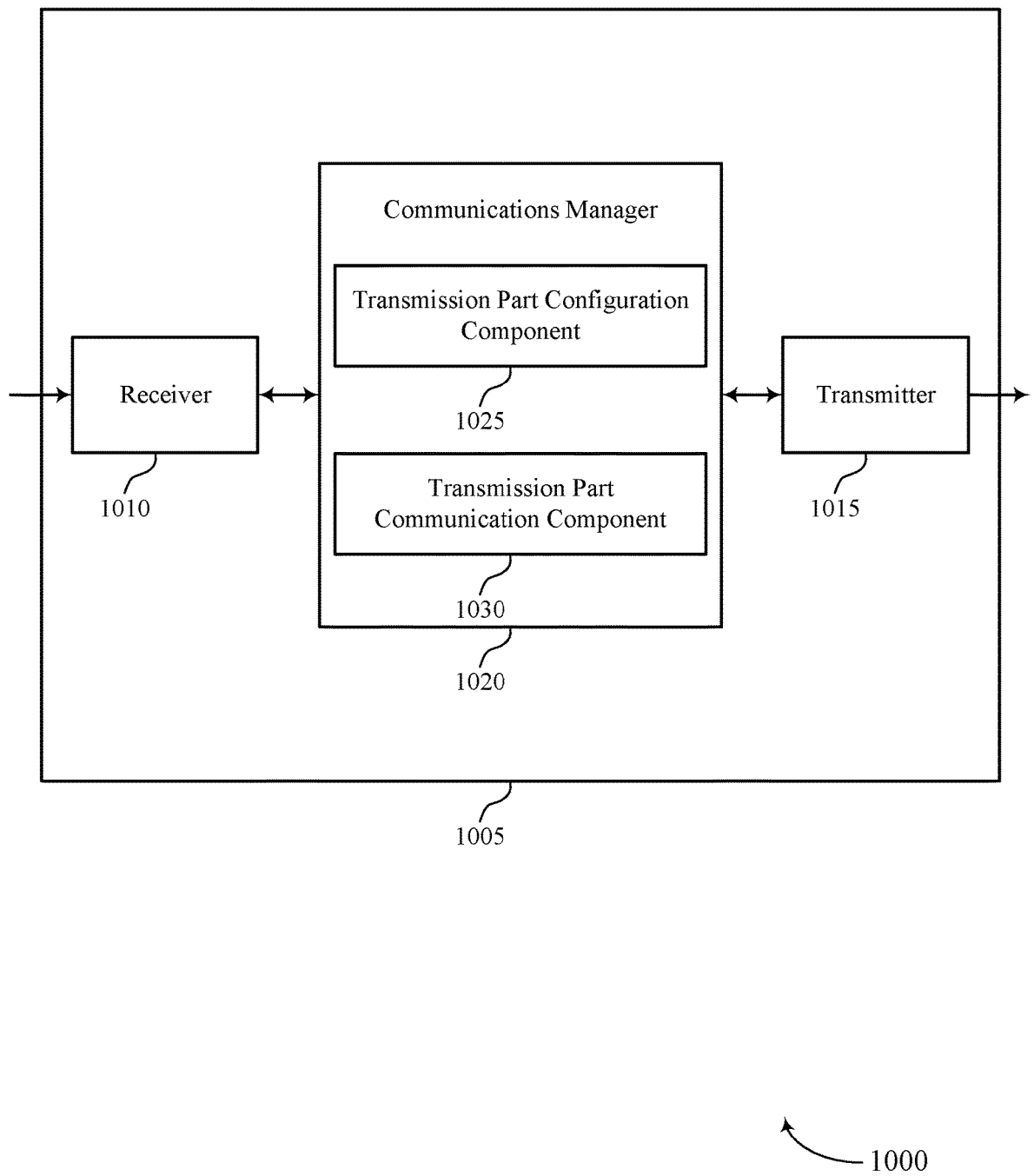

FIG. 10 shows a block diagram 1000 of a device 1005 that supports waveform-specific transmission parts in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to waveform-specific transmission parts). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to waveform-specific transmission parts). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of waveform-specific transmission parts as described herein. For example, the communications manager 1020 may include a transmission part configuration component 1025 a transmission part communication component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The transmission part configuration component 1025 may be configured as or otherwise support a means for transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The transmission part communication component 1030 may be configured as or otherwise support a means for communicating with the UE, during a first period, over the first transmission part via signaling that is based on the first waveform type. The transmission part communication component 1030 may be configured as or otherwise support a means for communicating with the UE, during a second time period after the first time period, over the second transmission part via signaling that is based on the second waveform type.

Figure 11:
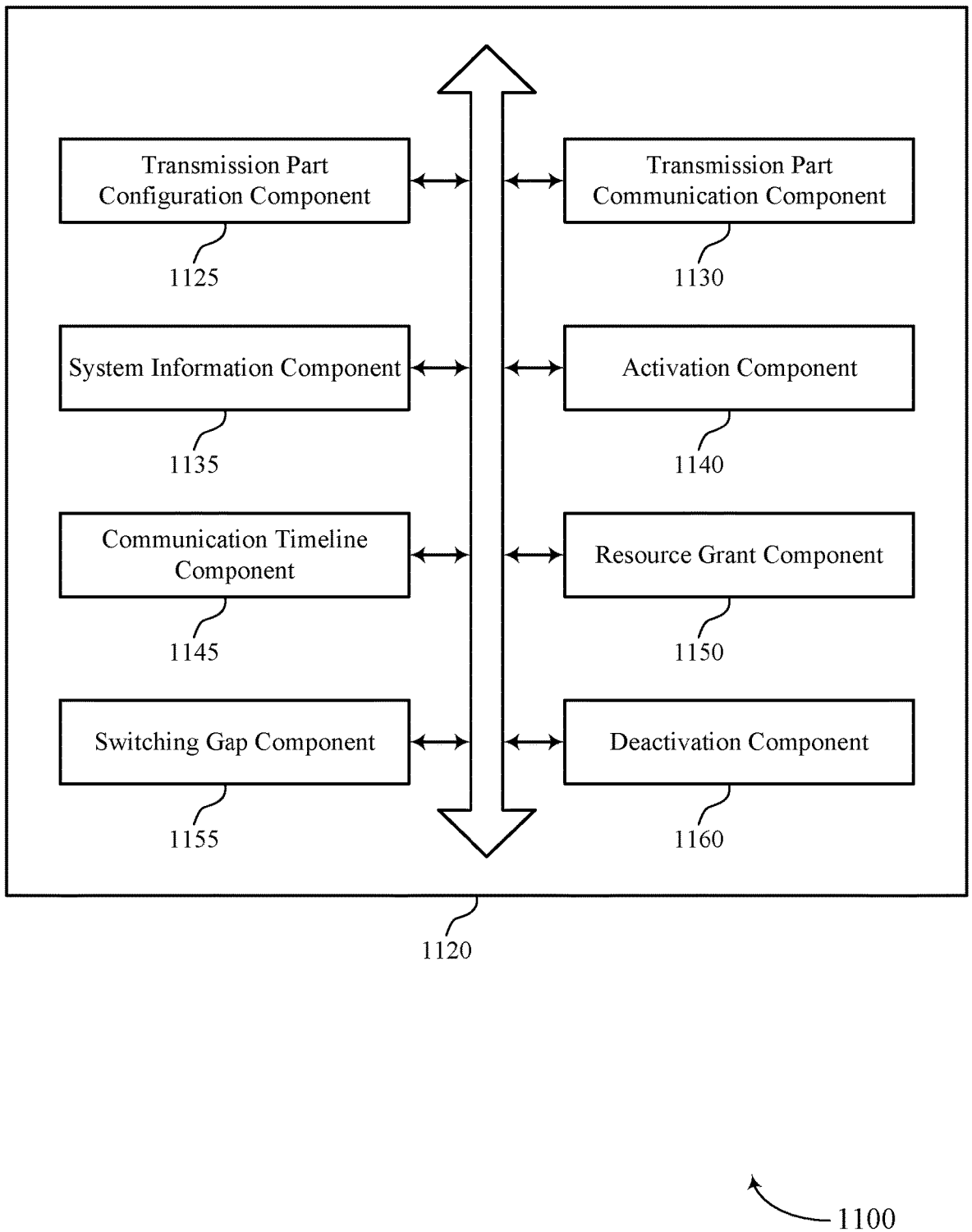
FIG. 11 shows a block diagram of a communications manager that supports waveform-specific transmission parts in accordance with aspects of the present disclosure.

FIG. 11 shows a block diagram 1100 of a communications manager 1120 that supports waveform-specific transmission parts in accordance with aspects of the present disclosure. The communications manager 1120 may be an example of aspects of a communications manager 920, a communications manager 1020, or both, as described herein. The communications manager 1120, or various components thereof, may be an example of means for performing various aspects of waveform-specific transmission parts as described herein. For example, the communications manager 1120 may include a transmission part configuration component 1125, a transmission part communication component 1130, a system information component 1135, an activation component 1140, a communication timeline component 1145, a resource grant component 1150, a switching gap component 1155, a deactivation component 1160, or any combination thereof. Each of these components may communicate, directly or indirectly, with one another (e.g., via one or more buses).

The communications manager 1120 may support wireless communication at a base station in accordance with examples as disclosed herein. The transmission part configuration component 1125 may be configured as or otherwise support a means for transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The transmission part communication component 1130 may be configured as or otherwise support a means for communicating with the UE, during a first period, over the first transmission part via signaling that is based on the first waveform type. In some examples, the transmission part communication component 1130 may be configured as or otherwise support a means for communicating with the UE, during a second time period after the first time period, over the second transmission part via signaling that is based on the second waveform type.

In some examples, the system information component 1135 may be configured as or otherwise support a means for transmitting an SIB including a configuration of an initial transmission part different than the first transmission part and the second transmission part, where the SIB associates the initial transmission part with an initial waveform type that may be the first waveform type, the second waveform type, or a third waveform type. In some examples, the transmission part communication component 1130 may be configured as or otherwise support a means for communicating with the UE over the initial transmission part via signaling that is based on the initial waveform type before the first time period.

In some examples, the transmission part configuration component 1125 may be configured as or otherwise support a means for transmitting an indication of a default transmission part of the set of transmission parts, where the default transmission part includes the first transmission part and the communicating with the UE over the first transmission part during the first time period is based on the indication of the default transmission part.

In some examples, the activation component 1140 may be configured as or otherwise support a means for transmitting, to the UE, an activation message for one or more transmission parts of the set of transmission parts including the second transmission part, where the communicating over the second transmission part associated with the second waveform type is based on the activation message.

In some examples, the deactivation component 1160 may be configured as or otherwise support a means for transmitting, to the UE, a deactivation message for the one or more transmission parts of the set of transmission parts. In some examples, the transmission part communication component 1130 may be configured as or otherwise support a means for switching, based on transmitting the deactivation message, from communicating with the UE over the second transmission part associated with the second waveform type to communicating with the UE over the first transmission part associated with the first waveform type or to communicating with the UE over a third transmission part associated with a third waveform type.

In some examples, the deactivation component 1160 may be configured as or otherwise support a means for transmitting, to the UE, an indication of a duration for a timer associated with the one or more transmission parts, where the one or more transmission parts each become deactivated for the UE upon expiration of the timer. In some examples, the transmission part communication component 1130 may be configured as or otherwise support a means for switching, based on the expiration of the timer, from communicating with the UE over the second transmission part associated with the second waveform type to communicating with the UE over the first transmission part associated with the first waveform type or to communicating with the UE over a third transmission part associated with a third waveform type.

In some examples, the first transmission part and the second transmission part are concurrently active for the UE.

In some examples, the set of transmission parts may include a set of uplink-specific transmission parts associated with a set of uplink-specific communication parameters. In some examples, the set of transmission parts may include a set of downlink-specific transmission parts associated with a set of downlink-specific communication parameters.

In some examples, each transmission part of the set of transmission parts is for both uplink communication and downlink communication. In some examples, the indication associates each transmission part of the set of transmission parts with a respective set of communication parameters that are common for the uplink communication and the downlink communication.

In some examples, at least one of the first transmission part and the second transmission part is discontinuous in time. In such examples, to support communicating with the UE over the first transmission part or the second transmission part, the communication timeline component 1145 may be configured as or otherwise support a means for communicating in accordance with a communication timeline that is transparent to one or more time gaps associated with at least one of the first transmission part and the second transmission part being discontinuous in time.

In some examples, at least one of the first transmission part and the second transmission part is discontinuous in time. In such examples, to support communicating with the UE over the first transmission part or the second transmission part, the communication timeline component 1145 may be configured as or otherwise support a means for communicating in accordance with a communication timeline that accounts for one or more time gaps associated with at least one of the first transmission part and the second transmission part being discontinuous in time.

In some examples, the resource grant component 1150 may be configured as or otherwise support a means for transmitting, to the UE, a grant for a transmission resource outside of one or more active transmission parts of the set of transmission parts. In some examples, the resource grant component 1150 may be configured as or otherwise support a means for communicating with the UE, based on the grant, via the transmission resource that is outside of the one or more active transmission parts.

In some examples, the switching gap component 1155 may be configured as or otherwise support a means for transmitting, to the UE, a configuration of one or more switching gaps or one or more guard bands each between a respective pair of transmission parts within the set of transmission parts. In some examples, the switching gap component 1155 may be configured as or otherwise support a means for switching, during a switching gap of the one or more switching gaps, from communicating with the UE over the first transmission part associated with the first waveform type to communicating with the UE over the second transmission part associated with the second waveform type.

In some examples, the transmission part configuration component 1125 may be configured as or otherwise support a means for receiving, from the UE, a capability message indicating a set of waveform types that the UE is capable of using, where the indication of the set of transmission parts is based on the capability message.

In some examples, the respective set of time resources and frequency resources for a transmission part of the set of transmission parts may be discontinuous in time, discontinuous in frequency, or discontinuous in both time and frequency.

In some examples, the first waveform type includes a first one of a single-carrier frequency domain waveform, a single-carrier time domain waveform, or a multi-carrier waveform. In some examples, the second waveform type includes a second one of the single-carrier frequency domain waveform, the single-carrier time domain waveform, or the multi-carrier waveform.

Figure 12:
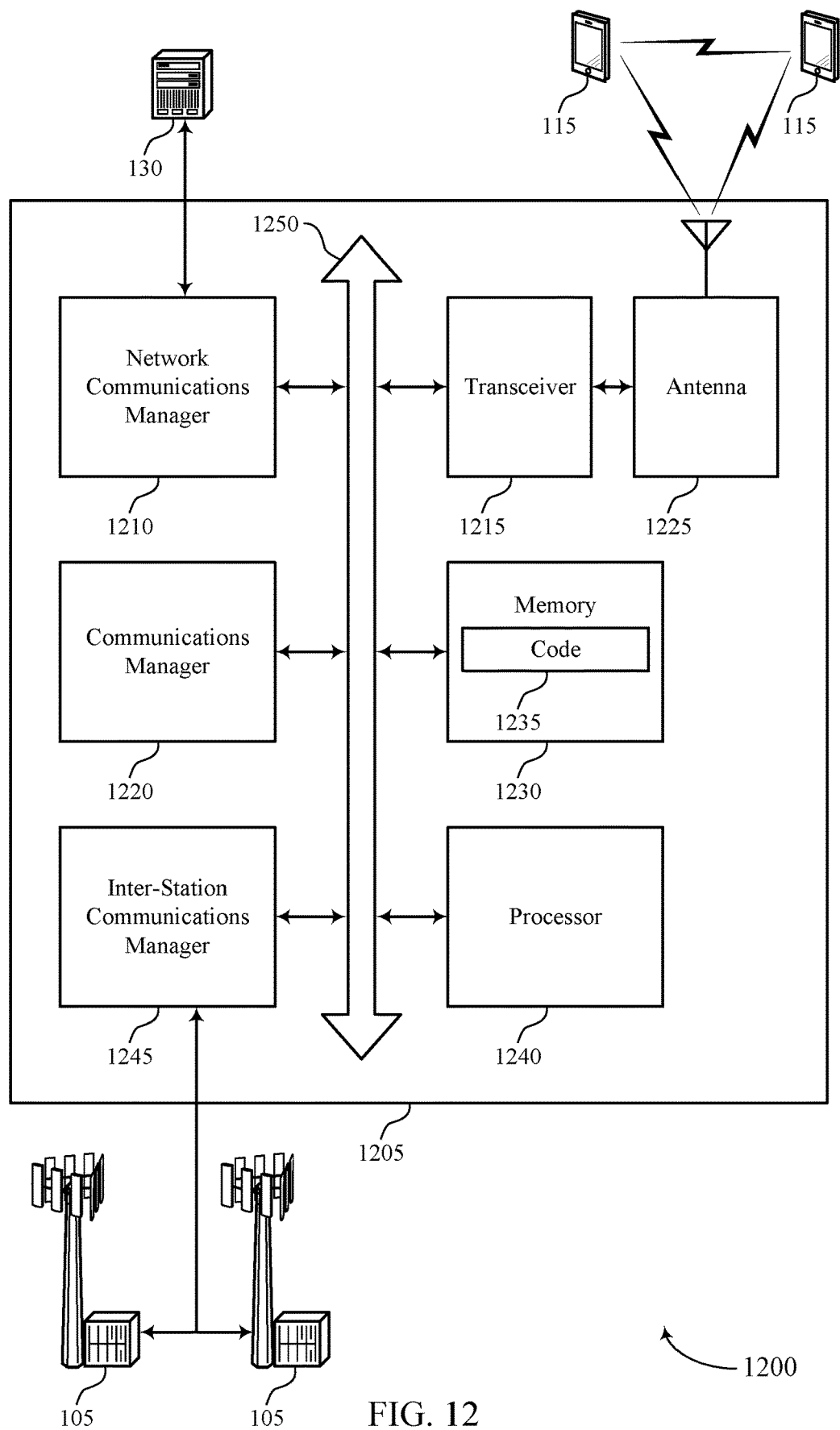
FIG. 12 shows a diagram of a system including a device that supports waveform-specific transmission parts in accordance with aspects of the present disclosure.

FIG. 12 shows a diagram of a system 1200 including a device 1205 that supports waveform-specific transmission parts in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting waveform-specific transmission parts). For example, the device 1205 or a component of the device 1205 may include a processor 1240 and memory 1230 coupled to the processor

1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The communications manager 1220 may be configured as or otherwise support a means for communicating with the UE, during a first period, over the first transmission part via signaling that is based on the first waveform type. The communications manager 1220 may be configured as or otherwise support a means for communicating with the UE, during a second time period after the first time period, over the second transmission part via signaling that is based on the second waveform type.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of waveform-specific transmission parts as described herein, or the processor 1240 and the memory 1230 may be otherwise configured to perform or support such operations.

Figure 13:
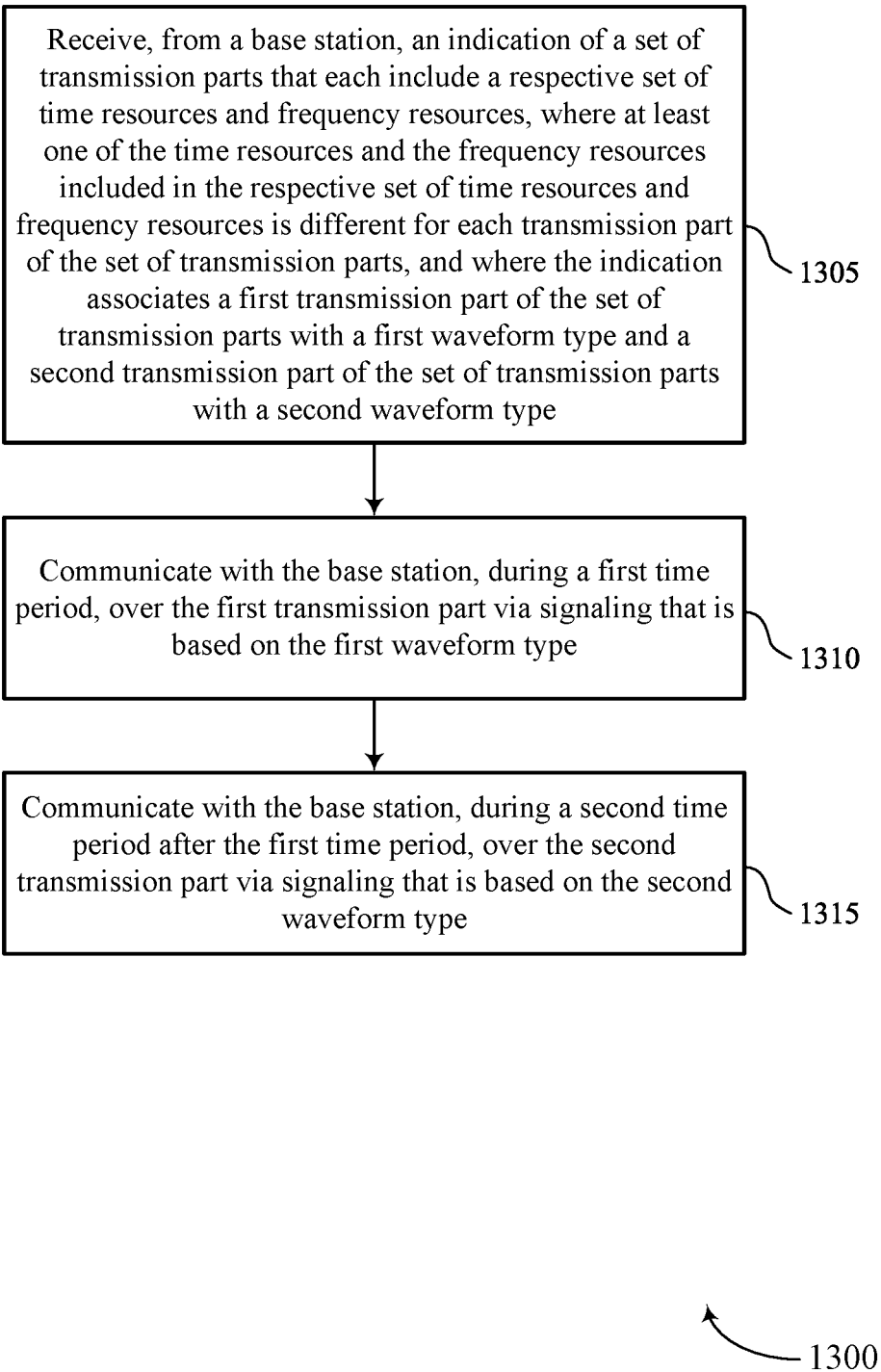
FIGS. 13 through 16 show flowcharts illustrating methods that support waveform-specific transmission parts in accordance with aspects of the present disclosure.

FIG. 13 shows a flowchart illustrating a method 1300 that supports waveform-specific transmission parts in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and a second transmission part of the set of transmission parts with a second waveform type. The operations of 1305 may be performed in accordance with examples as disclosed herein. In some examples, aspects of the operations of 1305 may be performed by a transmission part configuration component 725 as described with reference to FIG. 7.

At 1310, the method may include communicating with the base station, during a first time period, over the first transmission part via signaling that is based on the first waveform type. The operations of 1310 may be performed in accordance with examples as disclosed herein. In some examples, aspects of the operations of 1310 may be performed by a transmission part communication component 730 as described with reference to FIG. 7.

At 1315, the method may include communicating with the base station, during a second time period after the first time period, over the second transmission part via signaling that is based on the second waveform type. The operations of 1315 may be performed in accordance with examples as disclosed herein. In some examples, aspects of the operations of 1315 may be performed by a transmission part communication component 730 as described with reference to FIG. 7.

Figure 14:
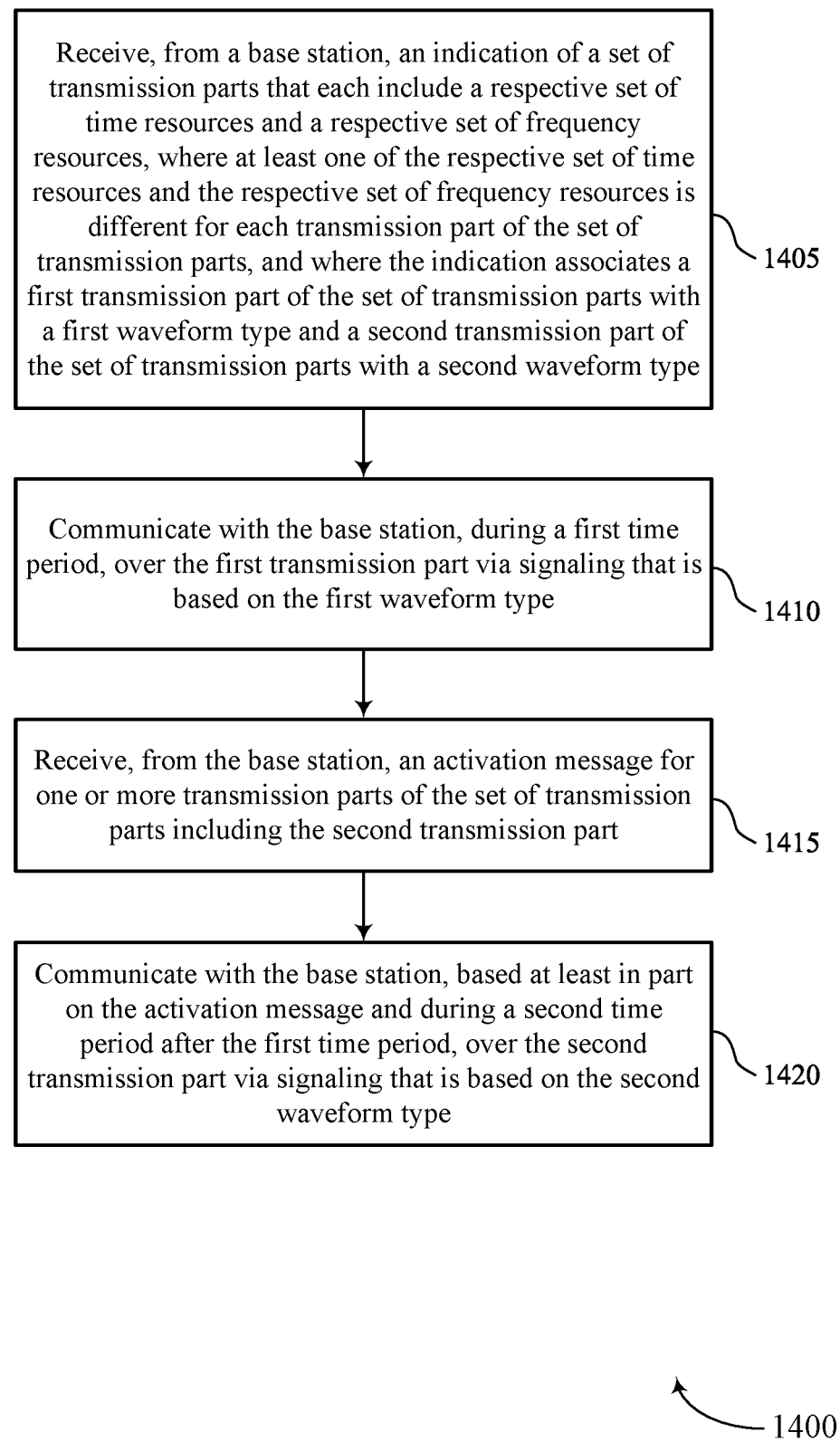

FIG. 14 shows a flowchart illustrating a method 1400 that supports waveform-specific transmission parts in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and associates a second transmission part of the set of transmission parts with a second waveform type. The operations of 1405 may be performed in accordance with examples as disclosed herein. In some examples, aspects of the operations of 1405 may be performed by a transmission part configuration component 725 as described with reference to FIG. 7.

At 1410, the method may include communicating with the base station, during a first time period, over the first transmission part via signaling that is based on the first waveform type. The operations of 1410 may be performed in accordance with examples as disclosed herein. In some examples, aspects of the operations of 1410 may be performed by a transmission part communication component 730 as described with reference to FIG. 7.

At 1415, the method may include receiving, from the base station, an activation message for one or more transmission parts of the set of transmission parts including the second transmission part. The operations of 1415 may be performed in accordance with examples as disclosed herein. In some examples, aspects of the operations of 1415 may be performed by an activation component 740 as described with reference to FIG. 7.

At 1420, the method may include communicating with the base station, based at least in part on the activation message and during a second time period after the first time period, over the second transmission part via signaling that is based on the second waveform type. The operations of 1420 may be performed in accordance with examples as disclosed herein. In some examples, aspects of the operations of 1420 may be performed by a transmission part communication component 730 as described with reference to FIG. 7.

Figure 15:
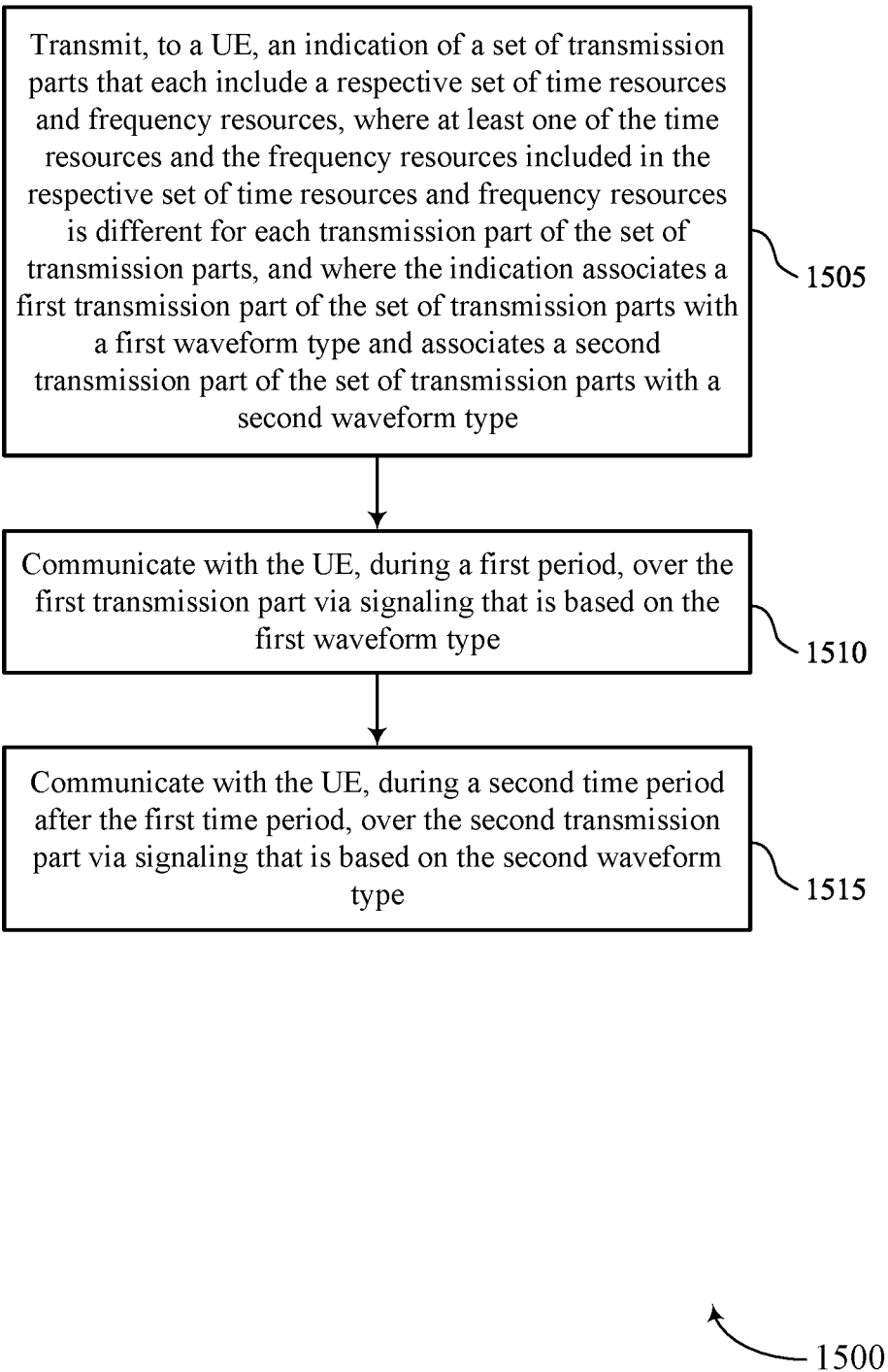

FIG. 15 shows a flowchart illustrating a method 1500 that supports waveform-specific transmission parts in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and associates a second transmission part of the set of transmission parts with a second waveform type. The operations of 1505 may be performed in accordance with examples as disclosed herein. In some examples, aspects of the operations of 1505 may be performed by a transmission part configuration component 1125 as described with reference to FIG. 11.

At 1510, the method may include communicating with the UE, during a first period, over the first transmission part via signaling that is based on the first waveform type. The operations of 1510 may be performed in accordance with examples as disclosed herein. In some examples, aspects of the operations of 1510 may be performed by a transmission part communication component 1130 as described with reference to FIG. 11.

At 1515, the method may include communicating with the UE, during a second time period after the first time period, over the second transmission part via signaling that is based on the second waveform type. The operations of 1515 may be performed in accordance with examples as disclosed herein. In some examples, aspects of the operations of 1515 may be performed by a transmission part communication component 1130 as described with reference to FIG. 11.

Figure 16:
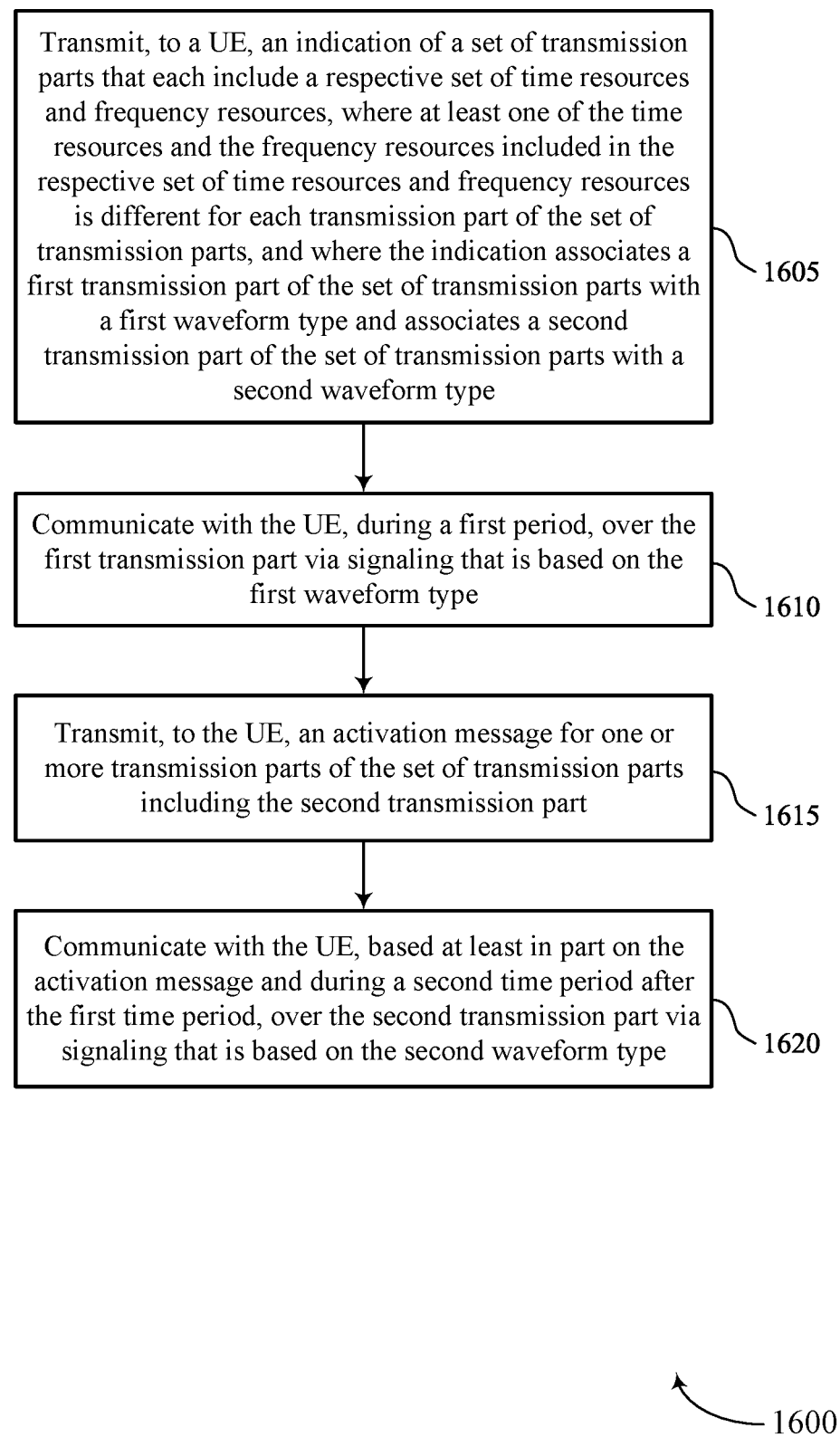

FIG. 16 shows a flowchart illustrating a method 1600 that supports waveform-specific transmission parts in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication of a set of transmission parts that each include a respective set of time resources and frequency resources, where at least one of the time resources and the frequency resources included in the respective set of time resources and frequency resources is different for each transmission part of the set of transmission parts, and where the indication associates a first transmission part of the set of transmission parts with a first waveform type and associates a second transmission part of the set of transmission parts with a second waveform type. The operations of 1605 may be performed in accordance with examples as disclosed herein. In some examples, aspects of the operations of 1605 may be performed by a transmission part configuration component 1125 as described with reference to FIG. 11.

At 1610, the method may include communicating with the UE, during a first period, over the first transmission part via signaling that is based on the first waveform type. The operations of 1610 may be performed in accordance with examples as disclosed herein. In some examples, aspects of the operations of 1610 may be performed by a transmission part communication component 1130 as described with reference to FIG. 11.

At 1615, the method may include transmitting, to the UE, an activation message for one or more transmission parts of the set of transmission parts including the second transmission part. The operations of 1615 may be performed in accordance with examples as disclosed herein. In some examples, aspects of the operations of 1615 may be performed by an activation component 1140 as described with reference to FIG. 11.

At 1620, the method may include communicating with the UE, based at least in part on the activation message and during a second time period after the first time period, over the second transmission part via signaling that is based on the second waveform type. The operations of 1620 may be performed in accordance with examples as disclosed herein. In some examples, aspects of the operations of 1620 may be performed by a transmission part communication component 1130 as described with reference to FIG. 11.

The following provides an overview of aspects of the present disclosure:

Aspect 1: A method for wireless communication at a UE, comprising: receiving, from a base station, an indication of a set of transmission parts that each comprise a respective set of time resources and frequency resources, wherein at least one of the time resources and the frequency resources included in the respective set of time resources and frequency resources is different for each transmission part of the set of transmission parts, and wherein the indication associates a first transmission part of the set of transmission parts with a first waveform type and a second transmission part of the set of transmission parts with a second waveform type; communicating with the base station, during a first time period, over the first transmission part via signaling that is based at least in part on the first waveform type; and communicating with the base station, during a second time period after the first time period, over the second transmission part via signaling that is based at least in part on the second waveform type.

Aspect 2: The method of aspect 1, further comprising: receiving an SIB including a configuration of an initial transmission part different than the first transmission part and the second transmission part, wherein the SIB associates the initial transmission part with an initial waveform type that comprises the first waveform type, the second waveform type, or a third waveform type; and communicating with the base station over the initial transmission part via signaling that is based at least in part on the initial waveform type before the first time period.

Aspect 3: The method of any of aspects 1 or 2, further comprising: receiving an indication of a default transmission part of the set of transmission parts, wherein the default transmission part comprises the first transmission part and the communicating with the base station over the first transmission part during the first time period is based at least in part on the indication of the default transmission part.

Aspect 4: The method of any of aspects 1 through 3, further comprising: receiving, from the base station, an activation message for one or more transmission parts of the set of transmission parts including the second transmission part, wherein the communicating over the second transmission part associated with the second waveform type is based at least in part on the activation message.

Aspect 5: The method of aspect 4, further comprising: receiving, from the base station, a deactivation message for the one or more transmission parts of the set of transmission parts; and switching, based at least in part on the deactivation message, from communicating with the base station over the second transmission part associated with the second waveform type to communicating with the base station over the first transmission part associated with the first waveform type or to communicating with the base station over a third transmission part associated with a third waveform type.

Aspect 6: The method of any of aspects 4 or 5, further comprising: receiving, from the base station, an indication of a duration for a timer associated with the one or more transmission parts of the set of transmission parts, wherein the one or more transmission parts each become deactivated for the UE upon expiration of the timer; and switching, based at least in part on the expiration of the timer, from communicating with the base station over the second transmission part associated with the second waveform type to communicating with the base station over the first transmission part associated with the first waveform type or to communicating with the base station over a third transmission part associated with a third waveform type.

Aspect 7: The method of any of aspects 1 through 6, wherein the first transmission part and the second transmission part are concurrently active for the UE.

Aspect 8: The method of any of aspects 1 through 7, wherein the set of transmission parts comprises: a set of uplink-specific transmission parts associated with a first set of uplink-specific communication parameters; and a set of downlink-specific transmission parts associated with a set of downlink-specific communication parameters.

Aspect 9: The method of any of aspects 1 through 7, wherein each transmission part of the set of transmission parts is for both uplink communication and downlink communication, and the indication associates each transmission part of the set of transmission parts with a respective set of communication parameters that are common for the uplink communication and the downlink communication.

Aspect 10: The method of any of aspects 1 through 9, wherein at least one of the first transmission part and the second transmission part is discontinuous in time, and wherein the communicating with the base station over the first transmission part or the second transmission part comprises: communicating in accordance with a communication timeline that is transparent to one or more time gaps associated with at least one of the first transmission part and the second transmission part being discontinuous in time.

Aspect 11: The method of any of aspects 1 through 9, wherein at least one of the first transmission part and the second transmission part is discontinuous in time, and wherein the communicating with the base station over the first transmission part or the second transmission part comprises: communicating in accordance with a communication timeline that accounts for one or more time gaps associated with at least one of the first transmission part and the second transmission part being discontinuous in time.

Aspect 12: The method of any of aspects 1 through 11, further comprising: receiving, from the base station, a grant for a transmission resource outside of one or more active transmission parts of the set of transmission parts; and communicating with the base station, based at least in part on the grant, via the transmission resource that is outside of the one or more active transmission parts.

Aspect 13: The method of any of aspects 1 through 11, further comprising: receiving, from the base station, a grant for a transmission resource outside of one or more active transmission parts of the set of transmission parts; and refraining from communicating with the base station, based at least in part on the grant, via the transmission resource that is outside of the one or more active transmission parts.

Aspect 14: The method of any of aspects 1 through 13, further comprising: receiving, from the base station, a configuration of one or more switching gaps or one or more guard bands each between a respective pair of transmission parts within the set of transmission parts; and switching, during a switching gap of the one or more switching gaps, from communicating with the base station over the first transmission part associated with the first waveform type to communicating with the base station over the second transmission part associated with the second waveform type.

Aspect 15: The method of any of aspects 1 through 14, further comprising: transmitting, to the base station, a capability message indicating a set of waveform types that the UE is capable of using, wherein the indication of the set of transmission parts is based at least in part on the capability message.

Aspect 16: The method of any of aspects 1 through 15, wherein the respective set of time resources and frequency resources for a transmission part of the set of transmission parts is discontinuous in time, discontinuous in frequency, or discontinuous in both time and frequency.

Aspect 17: The method of any of aspects 1 through 16, wherein the first waveform type comprises a first one of a single carrier frequency domain waveform, a single carrier time domain waveform, or an OFDM waveform; and the second waveform type comprises a second one of the single carrier frequency domain waveform, the single carrier time domain waveform, or the OFDM waveform.

Aspect 18: A method for wireless communication at a base station, comprising: transmitting, to a UE, an indication of a set of transmission parts that each comprise a respective set of time resources and frequency resources, wherein at least one of the time resources and the frequency resources included in the respective set of time resources and frequency resources is different for each transmission part of the set of transmission parts, and wherein the indication associates a first transmission part of the set of transmission parts with a first waveform type and a second transmission part of the set of transmission parts with a second waveform type; communicating with the UE, during a first period, over the first transmission part via signaling that is based at least in part on the first waveform type; and communicating with the UE, during a second time period after the first time period, over the second transmission part via signaling that is based at least in part on the second waveform type.

Aspect 19: The method of aspect 18, further comprising: transmitting an SIB including a configuration of an initial transmission part different than the first transmission part and the second transmission part, wherein the SIB associates the initial transmission part with an initial waveform type that comprises the first waveform type, the second waveform type, or a third waveform type; and communicating with the UE over the initial transmission part via signaling that is based at least in part on the initial waveform type before first time period.

Aspect 20: The method of any of aspects 18 or 19, further comprising: transmitting an indication of a default transmission part of the set of transmission parts, wherein the default transmission part comprises the first transmission part and the communicating with the UE over the first transmission part during the first time period is based at least in part on the indication of the default transmission part.

Aspect 21: The method of any of aspects 18 through 20, further comprising: transmitting, to the UE, an activation message for one or more transmission parts of the set of transmission parts including the second transmission part, wherein the communicating over the second transmission part associated with the second waveform type is based at least in part on the activation message.

Aspect 22: The method of aspect 21, further comprising: transmitting, to the UE, a deactivation message for the one or more transmission parts of the set of transmission parts; and switching, based at least in part on transmitting the deactivation message, from communicating with the UE over the second transmission part associated with the second waveform type to communicating with the UE over the first transmission part associated with the first waveform type or to communicating with the UE over a third transmission part associated with a third waveform type.

Aspect 23: The method of any of aspects 21 or 22, further comprising: transmitting, to the UE, an indication of a duration for a timer associated with the one or more transmission parts, wherein the one or more transmission parts each become deactivated for the UE upon expiration of the timer; and switching, based at least in part on the expiration of the timer, from communicating with the UE over the second transmission part associated with the second waveform type to communicating with the UE over the first transmission part associated with the first waveform type or to communicating with the UE over a third transmission part associated with a third waveform type.

Aspect 24: The method of any of aspects 18 through 23, wherein the first transmission part and the second transmission part are concurrently active for the UE.

Aspect 25: The method of any of aspects 18 through 24, wherein the set of transmission parts comprises: a set of uplink-specific transmission parts associated with a first set of uplink-specific communication parameters; and a set of downlink-specific transmission parts associated with a set of downlink-specific communication parameters.

Aspect 26: The method of any of aspects 18 through 24, wherein each transmission part of the set of transmission parts is for both uplink communication and downlink communication, and the indication associates each transmission part of the set of transmission parts with a respective set of communication parameters that are common for the uplink communication and the downlink communication.

Aspect 27: The method of any of aspects 18 through 26, wherein at least one of the first transmission part and the second transmission part is discontinuous in time, and wherein the communicating with the UE over the first transmission part or the second transmission part comprises: communicating in accordance with a communication timeline that is transparent to one or more time gaps associated with at least one of the first transmission part and the second transmission part being discontinuous in time.

Aspect 28: The method of any of aspects 18 through 26, wherein at least one of the first transmission part and the second transmission part is discontinuous in time, and wherein the communicating with the UE over the first transmission part or the second transmission part comprises: communicating in accordance with a communication timeline that accounts for one or more time gaps associated with at least one of the first transmission part and the second transmission part being discontinuous in time.

Aspect 29: The method of any of aspects 18 through 28, further comprising: transmitting, to the UE, a grant for a transmission resource outside of one or more active transmission parts of the set of transmission parts; and communicating with the UE, based at least in part on the grant, via the transmission resource that is outside of the one or more active transmission parts.

Aspect 30: The method of any of aspects 18 through 29, further comprising: transmitting, to the UE, a configuration of one or more switching gaps or one or more guard bands each between a respective pair of transmission parts within the set of transmission parts; and switching, during a switching gap of the one or more switching gaps, from communicating with the UE over the first transmission part associated with the first waveform type to communicating with the UE over the second transmission part associated with the second waveform type.

Aspect 31: The method of any of aspects 18 through 30, further comprising: receiving, from the UE, a capability message indicating a set of waveform types that the UE is capable of using, wherein the indication of the set of transmission parts is based at least in part on the capability message.

Aspect 32: The method of any of aspects 18 through 31, wherein the respective set of time resources and frequency resources for a transmission part of the set of transmission parts is discontinuous in time, discontinuous in frequency, or discontinuous in both time and frequency.

Aspect 33: The method of any of aspects 18 through 32, wherein the first waveform type comprises a first one of a single carrier frequency domain waveform, a single carrier time domain waveform, or an OFDM waveform; and the second waveform type comprises a second one of the single carrier frequency domain waveform, the single carrier time domain waveform, or the OFDM waveform.

Aspect 34: An apparatus for wireless communication at a UE, comprising a processor; memory coupled with the processor; and instructions stored in the memory and executable by the processor to cause the apparatus to perform a method of any of aspects 1 through 17.

Aspect 35: An apparatus for wireless communication at a UE, comprising at least one means for performing a method of any of aspects 1 through 17.

Aspect 36: A non-transitory computer-readable medium storing code for wireless communication at a UE, the code comprising instructions executable by a processor to perform a method of any of aspects 1 through 17.

Aspect 37: An apparatus for wireless communication at a base station, comprising a processor; memory coupled with the processor; and instructions stored in the memory and executable by the processor to cause the apparatus to perform a method of any of aspects 18 through 33.

Aspect 38: An apparatus for wireless communication at a base station, comprising at least one means for performing a method of any of aspects 18 through 33.

Aspect 39: A non-transitory computer-readable medium storing code for wireless communication at a base station, the code comprising instructions executable by a processor to perform a method of any of aspects 18 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, an indication of a set of transmission parts that each comprise a respective set of time resources and frequency resources, wherein at least one of the time resources and the frequency resources included in the respective set of time resources and frequency resources is different for each transmission part of the set of transmission parts, and wherein the indication associates a first transmission part of the set of transmission parts with a first waveform type and a second transmission part of the set of transmission parts with a second waveform type;
   communicating with the base station, during a first time period, over the first transmission part via signaling that is based at least in part on the first waveform type;
   receiving, from the base station, a configuration of one or more switching gaps or one or more guard bands each between a respective pair of transmission parts within the set of transmission parts;
   switching, during a switching gap of the one or more switching gaps, from communicating with the base station over the first transmission part associated with the first waveform type to communicating with the base station over the second transmission part associated with the second waveform type; and
   communicating with the base station, during a second time period after the first time period, over the second transmission part via signaling that is based at least in part on the second waveform type.

2. The method of claim 1, further comprising:
   receiving a system information block including a configuration of an initial transmission part different than the first transmission part and the second transmission part, wherein the system information block associates the initial transmission part with an initial waveform type that comprises the first waveform type, the second waveform type, or a third waveform type; and
   communicating with the base station over the initial transmission part via signaling that is based at least in part on the initial waveform type before the first time period.

3. The method of claim 1, further comprising:
   receiving an indication of a default transmission part of the set of transmission parts, wherein the default transmission part comprises the first transmission part and the communicating with the base station over the first transmission part during the first time period is based at least in part on the indication of the default transmission part.

4. The method of claim 1, further comprising:
   receiving, from the base station, an activation message for one or more transmission parts of the set of transmission parts including the second transmission part, wherein the communicating over the second transmission part associated with the second waveform type is based at least in part on the activation message.

5. The method of claim 4, further comprising:
   receiving, from the base station, a deactivation message for the one or more transmission parts of the set of transmission parts; and
   switching, based at least in part on the deactivation message, from communicating with the base station over the second transmission part associated with the second waveform type to communicating with the base station over the first transmission part associated with the first waveform type or to communicating with the base station over a third transmission part associated with a third waveform type.

6. The method of claim 4, further comprising:
   receiving, from the base station, an indication of a duration for a timer associated with the one or more transmission parts of the set of transmission parts, wherein the one or more transmission parts each become deactivated for the UE upon expiration of the timer; and
   switching, based at least in part on the expiration of the timer, from communicating with the base station over the second transmission part associated with the second waveform type to communicating with the base station over the first transmission part associated with the first waveform type or to communicating with the base station over a third transmission part associated with a third waveform type.

7. The method of claim 1, wherein the first transmission part and the second transmission part are concurrently active for the UE.

8. The method of claim 1, wherein the set of transmission parts comprises:
   a set of uplink-specific transmission parts associated with a set of uplink-specific communication parameters; and
   a set of downlink-specific transmission parts associated with a set of downlink-specific communication parameters.

9. The method of claim 1, wherein
   each transmission part of the set of transmission parts is for both uplink communication and downlink communication, and
   the indication associates each transmission part of the set of transmission parts with a respective set of communication parameters that are common for the uplink communication and the downlink communication.

10. The method of claim 1, wherein at least one of the first transmission part and the second transmission part is discontinuous in time, and wherein the communicating with the base station over the first transmission part or the second transmission part comprises:
    communicating in accordance with a communication timeline that is transparent to one or more time gaps associated with at least one of the first transmission part and the second transmission part being discontinuous in time.

11. The method of claim 1, wherein at least one of the first transmission part and the second transmission part is discontinuous in time, and wherein the communicating with the base station over the first transmission part or the second transmission part comprises:
communicating in accordance with a communication timeline that accounts for one or more time gaps associated with at least one of the first transmission part and the second transmission part being discontinuous in time.

12. The method of claim 1, further comprising:
receiving, from the base station, a grant for a transmission resource outside of one or more active transmission parts of the set of transmission parts; and
communicating with the base station, based at least in part on the grant, via the transmission resource that is outside of the one or more active transmission parts.

13. The method of claim 1, further comprising:
receiving, from the base station, a grant for a transmission resource outside of one or more active transmission parts of the set of transmission parts; and
refraining from communicating with the base station, based at least in part on the grant, via the transmission resource that is outside of the one or more active transmission parts.

14. The method of claim 1, further comprising:
transmitting, to the base station, a capability message indicating a set of waveform types that the UE is configured to use, wherein the indication of the set of transmission parts is based at least in part on the capability message.

15. The method of claim 1, wherein the respective set of time resources and frequency resources for a transmission part of the set of transmission parts is discontinuous in time, discontinuous in frequency, or discontinuous in both time and frequency.

16. The method of claim 1, wherein:
the first waveform type comprises a first one of a single-carrier frequency domain waveform, a single-carrier time domain waveform, or a multi-carrier waveform; and
the second waveform type comprises a second one of the single-carrier frequency domain waveform, the single-carrier time domain waveform, or the multi-carrier waveform.

17. A method for wireless communication at a base station, comprising:
transmitting, to a user equipment (UE), an indication of a set of transmission parts that each comprise a respective set of time resources and frequency resources, wherein at least one of the time resources and the frequency resources included in the respective set of time resources and frequency resources is different for each transmission part of the set of transmission parts, and wherein the indication associates a first transmission part of the set of transmission parts with a first waveform type and a second transmission part of the set of transmission parts with a second waveform type;
communicating with the UE, during a first time period, over the first transmission part via signaling that is based at least in part on the first waveform type;
transmitting, to the UE, a configuration of one or more switching gaps or one or more guard bands each between a respective pair of transmission parts within the set of transmission parts;
switching, during a switching gap of the one or more switching gaps, from communicating with the UE over the first transmission part associated with the first waveform type to communicating with the UE over the second transmission part associated with the second waveform type; and
communicating with the UE, during a second time period after the first time period, over the second transmission part via signaling that is based at least in part on the second waveform type.

18. The method of claim 17, further comprising:
transmitting a system information block including a configuration of an initial transmission part different than the first transmission part and the second transmission part, wherein the system information block associates the initial transmission part with an initial waveform type that comprises the first waveform type, the second waveform type, or a third waveform type; and
communicating with the UE over the initial transmission part via signaling that is based at least in part on the initial waveform type before the first time period.

19. The method of claim 17, further comprising:
transmitting an indication of a default transmission part of the set of transmission parts, wherein the default transmission part comprises the first transmission part and the communicating with the UE over the first transmission part during the first time period is based at least in part on the indication of the default transmission part.

20. The method of claim 17, further comprising:
transmitting, to the UE, an activation message for one or more transmission parts of the set of transmission parts including the second transmission part, wherein the communicating over the second transmission part associated with the second waveform type is based at least in part on the activation message.

21. The method of claim 20, further comprising:
transmitting, to the UE, a deactivation message for the one or more transmission parts of the set of transmission parts; and
switching, based at least in part on transmitting the deactivation message, from communicating with the UE over the second transmission part associated with the second waveform type to communicating with the UE over the first transmission part associated with the first waveform type or to communicating with the UE over a third transmission part associated with a third waveform type.

22. The method of claim 20, further comprising:
transmitting, to the UE, an indication of a duration for a timer associated with the one or more transmission parts, wherein the one or more transmission parts each become deactivated for the UE upon expiration of the timer; and
switching, based at least in part on the expiration of the timer, from communicating with the UE over the second transmission part associated with the second waveform type to communicating with the UE over the first transmission part associated with the first waveform type or to communicating with the UE over a third transmission part associated with a third waveform type.

23. The method of claim 17, wherein the first transmission part and the second transmission part are concurrently active for the UE.

24. The method of claim 17, wherein the set of transmission parts comprises:
a set of uplink-specific transmission parts associated with a set of uplink-specific communication parameters; and
a set of downlink-specific transmission parts associated with a set of downlink-specific communication parameters.

25. The method of claim 17, wherein:
each transmission part of the set of transmission parts is for both uplink communication and downlink communication, and
the indication associates each transmission part of the set of transmission parts with a respective set of communication parameters that are common for the uplink communication and the downlink communication.

26. The method of claim 17, wherein at least one of the first transmission part and the second transmission part is discontinuous in time, and wherein the communicating with the UE over the first transmission part or the second transmission part comprises:
communicating in accordance with a communication timeline that is transparent to one or more time gaps associated with at least one of the first transmission part and the second transmission part being discontinuous in time.

27. The method of claim 17, wherein at least one of the first transmission part and the second transmission part is discontinuous in time, and wherein the communicating with the UE over the first transmission part or the second transmission part comprises:
communicating in accordance with a communication timeline that accounts for one or more time gaps associated with at least one of the first transmission part and the second transmission part being discontinuous in time.

28. The method of claim 17, further comprising:
transmitting, to the UE, a grant for a transmission resource outside of one or more active transmission parts of the set of transmission parts; and
communicating with the UE, based at least in part on the grant, via the transmission resource that is outside of the one or more active transmission parts.

29. The method of claim 17, further comprising:
receiving, from the UE, a capability message indicating a set of waveform types that the UE is configured to use, wherein the indication of the set of transmission parts is based at least in part on the capability message.

30. The method of claim 17, wherein the respective set of time resources and frequency resources for a transmission part of the set of transmission parts is discontinuous in time, discontinuous in frequency, or discontinuous in both time and frequency.

31. The method of claim 17, wherein:
the first waveform type comprises a first one of a single-carrier frequency domain waveform, a single-carrier time domain waveform, or a multi-carrier waveform; and
the second waveform type comprises a second one of the single-carrier frequency domain waveform, the single-carrier time domain waveform, or the multi-carrier waveform.

32. An apparatus for wireless communication at a user equipment (UE), comprising:
a processor;
memory coupled with the processor; and
instructions stored in the memory and executable by the processor to cause the apparatus to:
receive, from a base station, an indication of a set of transmission parts that each comprise a respective set of time resources and frequency resources, wherein at least one of the time resources and the frequency resources included in the respective set of time resources and frequency resources is different for each transmission part of the set of transmission parts, and wherein the indication associates a first transmission part of the set of transmission parts with a first waveform type and a second transmission part of the set of transmission parts with a second waveform type;
communicate with the base station, during a first time period, over the first transmission part via signaling that is based at least in part on the first waveform type;
receive, from the base station, a configuration of one or more switching gaps or one or more guard bands each between a respective pair of transmission parts within the set of transmission parts;
switch, during a switching gap of the one or more switching gaps, from communicating with the base station over the first transmission part associated with the first waveform type to communicating with the base station over the second transmission part associated with the second waveform type; and
communicate with the base station, during a second time period after the first time period, over the second transmission part via signaling that is based at least in part on the second waveform type.

33. The apparatus of claim 32, wherein the instructions are further executable by the processor to cause the apparatus to:
receive a system information block including a configuration of an initial transmission part different than the first transmission part and the second transmission part, wherein the system information block associates the initial transmission part with an initial waveform type that comprises the first waveform type, the second waveform type, or a third waveform type; and
communicate with the base station over the initial transmission part via signaling that is based at least in part on the initial waveform type before the first time period.

34. The apparatus of claim 32, wherein the instructions are further executable by the processor to cause the apparatus to:
receive an indication of a default transmission part of the set of transmission parts, wherein the default transmission part comprises the first transmission part and the communicating with the base station over the first transmission part during the first time period is based at least in part on the indication of the default transmission part.

35. The apparatus of claim 32, wherein the instructions are further executable by the processor to cause the apparatus to:
receive, from the base station, an activation message for one or more transmission parts of the set of transmission parts including the second transmission part, wherein the communicating over the second transmission part associated with the second waveform type is based at least in part on the activation message.

36. The apparatus of claim 35, wherein the instructions are further executable by the processor to cause the apparatus to:
receive, from the base station, a deactivation message for the one or more transmission parts of the set of transmission parts; and switch, based at least in part on the deactivation message, from communicating with the base station over the second transmission part associated with the second waveform type to communicating with the base station over the first transmission part associated with the first waveform type or to communicating with the base station over a third transmission part associated with a third waveform type.

37. The apparatus of claim 35, wherein the instructions are further executable by the processor to cause the apparatus to:
receive, from the base station, an indication of a duration for a timer associated with the one or more transmission parts of the set of transmission parts, wherein the one or more transmission parts are each to become deactivated for the UE upon expiration of the timer; and
switch, based at least in part on the expiration of the timer, from communicating with the base station over the second transmission part associated with the second waveform type to communicating with the base station over the first transmission part associated with the first waveform type or to communicating with the base station over a third transmission part associated with a third waveform type.

38. The apparatus of claim 32, wherein the first transmission part and the second transmission part are concurrently active for the UE.

39. The apparatus of claim 32, wherein the set of transmission parts comprises:
a set of uplink-specific transmission parts associate with a first set of uplink-specific communication parameters; and
a set of downlink-specific transmission parts associate with a set of downlink-specific communication parameters.

40. The apparatus of claim 32, wherein:
each transmission part of the set of transmission parts is for both uplink communication and downlink communication, and
the indication associates each transmission part of the set of transmission parts with a respective set of communication parameters that are common for the uplink communication and the downlink communication.

41. The apparatus of claim 32, wherein at least one of the first transmission part and the second transmission part is discontinuous in time, and wherein the instructions to communicate with the base station over the first transmission part or the second transmission part are executable by the processor to cause the apparatus to:
communicate in accordance with a communication timeline that is transparent to one or more time gaps associated with at least one of the first transmission part and the second transmission part being discontinuous in time.

42. The apparatus of claim 32, wherein at least one of the first transmission part and the second transmission part is discontinuous in time, and wherein the instructions to communicating with the base station over the first transmission part or the second transmission part are executable by the processor to cause the apparatus to:
communicate in accordance with a communication timeline that accounts for one or more time gaps associated with at least one of the first transmission part and the second transmission part being discontinuous in time.

43. The apparatus of claim 32, wherein the instructions are further executable by the processor to cause the apparatus to:
receive, from the base station, a grant for a transmission resource outside of one or more active transmission parts of the set of transmission parts; and
communicate with the base station, based at least in part on the grant, via the transmission resource that is outside of the one or more active transmission parts.

44. The apparatus of claim 32, wherein the instructions are further executable by the processor to cause the apparatus to:
receive, from the base station, a grant for a transmission resource outside of one or more active transmission parts of the set of transmission parts; and
refrain from communicating with the base station, based at least in part on the grant, via the transmission resource that is outside of the one or more active transmission parts.

45. The apparatus of claim 32, wherein the instructions are further executable by the processor to cause the apparatus to:
transmit, to the base station, a capability message indicating a set of waveform types that the UE is configured to use, wherein the indication of the set of transmission parts is based at least in part on the capability message.

46. The apparatus of claim 32, wherein the respective set of time resources and frequency resources for a transmission part of the set of transmission parts is discontinuous in time, is discontinuous in frequency, or is discontinuous in both time and frequency.

47. The apparatus of claim 32, wherein:
the first waveform type comprises a first one of a single carrier frequency domain waveform, a single carrier time domain waveform, or an orthogonal frequency division multiplexing waveform; and
the second waveform type comprises a second one of the single carrier frequency domain waveform, the single carrier time domain waveform, or the orthogonal frequency division multiplexing waveform.

48. An apparatus for wireless communication at a base station, comprising:
a processor;
memory coupled with the processor; and
instructions stored in the memory and executable by the processor to cause the apparatus to:
transmit, to a user equipment (UE), an indication of a set of transmission parts that each comprise a respective set of time resources and frequency resources, wherein at least one of the time resources and the frequency resources included in the respective set of time resources and frequency resources is different for each transmission part of the set of transmission parts, and wherein the indication associates a first transmission part of the set of transmission parts with a first waveform type and a second transmission part of the set of transmission parts with a second waveform type;
communicate with the UE, during a first period, over the first transmission part via signaling that is based at least in part on the first waveform type;
transmit, to the UE, a configuration of one or more switching gaps or one or more guard bands each between a respective pair of transmission parts within the set of transmission parts;
switch, during a switching gap of the one or more switching gaps, from communicating with the UE over the first transmission part associated with the first waveform type to communicating with the UE over the second transmission part associated with the second waveform type; and communicate with the UE, during a second time period after the first time period, over the second transmission part via signaling that is based at least in part on the second waveform type.

49. The apparatus of claim 48, wherein the instructions are further executable by the processor to cause the apparatus to:

transmit a system information block including a configuration of an initial transmission part different than the first transmission part and the second transmission part, wherein the system information block associates the initial transmission part with an initial waveform type that comprises the first waveform type, the second waveform type, or a third waveform type; and communicate with the UE over the initial transmission part via signaling that is based at least in part on the initial waveform type before first time period.

50. The apparatus of claim 48, wherein the instructions are further executable by the processor to cause the apparatus to:

transmit an indication of a default transmission part of the set of transmission parts, wherein the default transmission part comprises the first transmission part and the communicating with the UE over the first transmission part during the first time period is based at least in part on the indication of the default transmission part.

51. The apparatus of claim 48, wherein the instructions are further executable by the processor to cause the apparatus to:

transmit, to the UE, an activation message for one or more transmission parts of the set of transmission parts including the second transmission part, wherein the communicating over the second transmission part associated with the second waveform type is based at least in part on the activation message.

52. The apparatus of claim 51, wherein the instructions are further executable by the processor to cause the apparatus to:

transmit, to the UE, a deactivation message for the one or more transmission parts of the set of transmission parts; and switch, based at least in part on transmitting the deactivation message, from communicating with the UE over the second transmission part associated with the second waveform type to communicating with the UE over the first transmission part associated with the first waveform type or to communicating with the UE over a third transmission part associated with a third waveform type.

53. The apparatus of claim 51, wherein the instructions are further executable by the processor to cause the apparatus to:

transmit, to the UE, an indication of a duration for a timer associated with the one or more transmission parts, wherein the one or more transmission parts are each to become deactivated for the UE upon expiration of the timer; and switch, based at least in part on the expiration of the timer, from communicating with the UE over the second transmission part associated with the second waveform type to communicating with the UE over the first transmission part associated with the first waveform type or to communicating with the UE over a third transmission part associated with a third waveform type.

54. The apparatus of claim 48, wherein the first transmission part and the second transmission part are concurrently active for the UE.

55. The apparatus of claim 48, wherein the set of transmission parts comprises:

a set of uplink-specific transmission parts associate with a first set of uplink-specific communication parameters; and a set of downlink-specific transmission parts associate with a set of downlink-specific communication parameters.

56. The apparatus of claim 48, wherein:

each transmission part of the set of transmission parts is for both uplink communication and downlink communication, and the indication associates each transmission part of the set of transmission parts with a respective set of communication parameters that are common for the uplink communication and the downlink communication.

57. The apparatus of claim 48, wherein at least one of the first transmission part and the second transmission part is discontinuous in time, and wherein the instructions to communicate with the UE over the first transmission part or the second transmission part are executable by the processor to cause the apparatus to:

communicate in accordance with a communication timeline that is transparent to one or more time gaps associated with at least one of the first transmission part and the second transmission part being discontinuous in time.

58. The apparatus of claim 48, wherein at least one of the first transmission part and the second transmission part is discontinuous in time, and wherein the instructions to communicate with the UE over the first transmission part or the second transmission part are executable by the processor to cause the apparatus to:

communicate in accordance with a communication timeline that accounts for one or more time gaps associated with at least one of the first transmission part and the second transmission part being discontinuous in time.

59. The apparatus of claim 48, wherein the instructions are further executable by the processor to cause the apparatus to:

transmit, to the UE, a grant for a transmission resource outside of one or more active transmission parts of the set of transmission parts; and communicate with the UE, based at least in part on the grant, via the transmission resource that is outside of the one or more active transmission parts.

60. The apparatus of claim 48, wherein the instructions are further executable by the processor to cause the apparatus to:

receive, from the UE, a capability message indicating a set of waveform types that the UE is configured to use, wherein the indication of the set of transmission parts is based at least in part on the capability message.

61. The apparatus of claim 48, wherein the respective set of time resources and frequency resources for a transmission part of the set of transmission parts is discontinuous in time, is discontinuous in frequency, or is discontinuous in both time and frequency.

62. The apparatus of claim 48, wherein:

the first waveform type comprises a first one of a single carrier frequency domain waveform, a single carrier time domain waveform, or an orthogonal frequency division multiplexing waveform; and the second waveform type comprises a second one of the single carrier frequency domain waveform, the single carrier time domain waveform, or the orthogonal frequency division multiplexing waveform.

* * * * *